US011982612B2

(12) United States Patent
Hiramatsu et al.

(10) Patent No.: US 11,982,612 B2
(45) Date of Patent: May 14, 2024

(54) SYSTEMS AND METHODS FOR COLOR-SCALABLE FLOW CYTOMETRY WITH RAMAN TAGS

(71) Applicant: BaySpec, Inc., San Jose, CA (US)

(72) Inventors: Kotaro Hiramatsu, Tokyo (JP); Ryo Nishiyama, Tokyo (JP); Keisuke Goda, Tokyo (JP); Kosuke Dodo, Saitama (JP); Shintaro Kawamura, Saitama (JP); Mikiko Sodeoka, Saitama (JP); Hideyusi Suzuki, San Jose, CA (US); Charlie Zhang, San Jose, CA (US); William Yang Terziyan, San Jose, CA (US)

(73) Assignee: BaySpec, Inc., San Jose, CA (US)

(*) Notice: Subject to any disclaimer, the term of this patent is extended or adjusted under 35 U.S.C. 154(b) by 0 days.

(21) Appl. No.: 17/724,462

(22) Filed: Apr. 19, 2022

(65) Prior Publication Data
US 2023/0333001 A1    Oct. 19, 2023

(51) Int. Cl.
*G01N 15/1434* (2024.01)
*G01N 15/1404* (2024.01)
*G01N 21/65* (2006.01)
*G01N 15/10* (2006.01)

(52) U.S. Cl.
CPC ..... *G01N 15/1434* (2013.01); *G01N 15/1404* (2013.01); *G01N 21/65* (2013.01); *G01N 2015/1006* (2013.01); *G01N 2015/1438* (2013.01)

(58) Field of Classification Search
CPC .......... G01N 15/1434; G01N 15/1404; G01N 21/65; G01N 2015/1438
See application file for complete search history.

(56) References Cited

U.S. PATENT DOCUMENTS

| | | | |
|---|---|---|---|
| 10,379,042 B2* | 8/2019 | Ideguchi | G02B 26/0816 |
| 2005/0064435 A1* | 3/2005 | Su | B82Y 5/00 435/7.1 |
| 2018/0372632 A1* | 12/2018 | Min | G01N 33/5005 |

OTHER PUBLICATIONS

Owens, E. A. et al. Near-Infrared Illumination of Native Tissues for Image-Guided Surgery. J. Med. Chem. 59, 5311-5323 (2016).
Hyun, H. et al. Structure-inherent targeting of near-infrared fluorophores for parathyroid and thyroid gland imaging. Nat. Med. 21, 192-197 (2015).
Böhm, A. & Bach, T. Radical Reactions Induced by Visible Light in Dichloromethane Solutions of Hunig's Base: Synthetic Applications and Mechanistic Observations. Chemistry—A European Journal vol. 22 15921-15928 (2016).

(Continued)

*Primary Examiner* — Tarifur R Chowdhury
*Assistant Examiner* — Kemaya Nguyen
(74) *Attorney, Agent, or Firm* — Fox Rothschild LLP; Carol E. Thorstad-Forsyth

(57) ABSTRACT

Systems and methods for flow cytometry. The methods comprise: labeling cells of a sample with Raman tags; causing the sample to flow through a microfluidic channel of a flow cytometer through which a laser beam passes; detecting Raman signals emitted from the Raman tags while being illuminated by the laser beam; and determining characteristics of the cells based on the detected Raman signals.

31 Claims, 27 Drawing Sheets

(56) References Cited

OTHER PUBLICATIONS

Marvell, E. N., Li, T. H. & Paik, C. Formation of phenylpyridinium chloride from 5-anilino-N-phenyl-2,4-pentadienyleniminium chloride in acidic media. Tetrahedron Lett. 14, 2089-2092 (1973).

Cossarizza, A. et al. Guidelines for the use of flow cytometry and cell sorting in immunological studies (second edition). Eur. J. Immunol. 49, (2019).

Nitta, N. et al. Intelligent Image-Activated Cell Sorting. Cell 175, 266-276.e13 (2018).

Mikami, H. et al. Virtual-freezing fluorescence imaging flow cytometry. Nat. Commun. 11, 1162 (2020).

Brown, M. & Wittwer, C. Flow cytometry: Principles and clinical applications in hematology. Clin. Chem. 46, 1221-1229 (2000).

Nishikawa, M. et al. Massive image-based single-cell profiling reveals high levels of circulating platelet aggregates in patients with COVID-19. Nat. Commun. 12, 7135 (2021).

Brummelman, J. et al. Development, application and computational analysis of high-dimensional fluorescent antibody panels for single-cell flow cytometry. Nat. Protoc. 14, 1946-1969 (2019).

Lugli, E., Roederer, M. & Cossarizza, A. Data analysis in flow cytometry: The future just started. Cytometry Part A vol. 77 (2010).

Dean, K. M. & Palmer, A. E. Advances in fluorescence labeling strategies for dynamic cellular imaging. Nature Chemical Biology vol. 10 (2014).

Niehörster, T. et al. Multi-target spectrally resolved fluorescence lifetime imaging microscopy. Nat. Methods 13, (2016).

Wei, L. et al. Super-multiplex vibrational imaging. Nature 544, 465-470 (2017).

Schmutz, S., Valente, M., Cumano, A. & Novault, S. Spectral cytometry has unique properties allowing multicolor analysis of cell suspensions isolated from solid tissues. PLoS One 11, 1-15 (2016).

Nolan, J. P. & Condello, D. Spectral Flow Cytometry. Curr. Protoc. Cytom. 63, 1.27.1-1.27.13 (2013).

Grégori, G. et al. Hyperspectral cytometry at the single-cell level using a 32-channel photodetector. Cytom. Part A 81 A, 35-44 (2012).

Bendall, S. C. et al. Single-Cell Mass Cytometry of Differential Immune and Drug Responses Across a Human Hematopoietic Continuum. Science 332, 687 (2011).

Hartmann, F. J. & Bendall, S. C. Immune monitoring using mass cytometry and related high-dimensional imaging approaches. Nature Reviews Rheumatology vol. 16 87-99 (2020).

Hu, F. et al. Supermultiplexed optical imaging and barcoding with engineered polyynes. Nat. Methods (2018) doi:10.1038/nmeth.4578.

Hiramatsu, K. et al. High-throughput label-free molecular fingerprinting flow cytometry. Sci. Adv. 5, eaau0241 (2019).

Gala de Pablo, J., Lindley, M., Hiramatsu, K. & Goda, K. High-Throughput Raman Flow Cytometry and Beyond. Acc. Chem. Res. 54, 2132 (2021).

Lindley, M., Gala de Pablo, J., Kinegawa, R., Hiramatsu, K. & Goda, K. Highly sensitive Fourier-transform coherent anti-Stokes Raman scattering spectroscopy via genetic algorithm pulse shaping. Opt. Lett. 46, 4320.

Hiramatsu, K., Yamada, K., Lindley, M., Suzuki, K. & Goda, K. Large-scale label-free single-cell analysis of paramylon in Euglena gracilis by high-throughput broadband Raman flow cytometry. Biomed. Opt. Express 11, 1752-1759 (2020).

Cui, M., Joffre, M., Skodack, J. & Ogilvie, J. P. Interferometric Fourier transform Coherent anti-Stokes Raman Scattering. Opt. Express 14, 8448 (2006).

Chen, C. et al. Multiplexed live-cell profiling with Raman probes. Nat. Commun. 12, 1-13 (2021).

Zhao, Z. et al. Ultra-bright Raman dots for multiplexed optical imaging. Nat. Commun. 12, 1305 (2021).

Dodo, K. et al. Synthesis of deuterated ?-linolenic acid and application for biological studies: Metabolic tuning and Raman imaging. Chem. Commun. 57, 2180-2183 (2021).

Egoshi, S., Dodo, K., Ohgane, K. & Sodeoka, M. Deuteration of terminal alkynes realizes simultaneous live cell Raman imaging of similar alkyne-tagged biomolecules. Org. Biomol. Chem. 19, 8232-8236 (2021).

Midi, H. & Bagheri, A. Robust multicollinearity diagnostic measure in collinear data set. Int. Conf. Appl. Math. Simulation, Model.— Proc. 138-142 (2010).

Lee, J. H., Gomez, I. J., Sitterle, V. B. & Meredith, J. C. Dye-labeled polystyrene latex microspheres prepared via a combined swelling-diffusion technique. J. Colloid Interface Sci. 363, 137-144 (2011).

Van Der Maaten, L. & Hinton, G. Visualizing data using t-SNE. J. Mach. Learn. Res. 9, (2008).

Monti, D. M. et al. Biocompatibility, uptake and endocytosis pathways of polystyrene nanoparticles in primary human renal epithelial cells. J. Biotechnol. 193, 3-10 (2015).

Hansen, S. H., Sandvig, K. & Van Deurs, B. Clathrin and HA2 adaptors: Effects of potassium depletion, hypertonic medium, and cytosol acidification. J. Cell Biol. 121, (1993).

Chen, J. et al. Ultrabright Fluorescent Organic Nanoparticles Based on Small-Molecule Ionic Isolation Lattices. Angew. Chemie—Int. Ed. 60, 9450-9458 (2021).

\* cited by examiner

15: X=H   18: X=Br
16: X=Me  19: X=F
17: X=Cl  20: X=OMe

SYSTEMS AND METHODS FOR COLOR-SCALABLE FLOW CYTOMETRY WITH RAMAN TAGS

BACKGROUND

Statement of the Technical Field

The present document concerns flow cytometers. More specifically, the present document concerns systems and methods for color-scalable flow cytometry with Raman tags.

DESCRIPTION OF THE RELATED ART

Flow cytometry is an indispensable tool in diverse areas of biology and medicine (for example, cancer biology, immunology, microbiology and/or COVID-19 biology) for counting and analyzing cells in large heterogeneous populations. In simple flow cytometry methods, rough morphological information (such as cell diameter and granularity) is obtained based on measurements of light scattering and electronic impedance. For chemical analysis, fluorescence detection is performed on each cell based on the use of fluorescent probes that specifically bind to target molecules on the cell surface or within the cell. Moreover, simultaneous analysis of target molecules is possible by using different types of fluorescent probes with different fluorescence emission wavelengths. This multiplexing technique is essential for maximizing the amount of information obtained in a single flow cytometry run.

However, flow cytometry has a critical limitation: the color barrier. The number of chemical traits that can be simultaneously resolved is typically limited to several due to the spectral overlap between fluorescence signals from different fluorescent probes. This limitation does not allow studying highly heterogeneous cell populations such as immune cells. To break the color barrier, spectral flow cytometry has recently been proposed and demonstrated to simultaneously probe many molecules by its super-multiplex sensing capability. It detects the emission spectrum of every fluorescent molecule with an optical spectrometer, followed by spectral unmixing to decode the combined fluorescence spectrum. However, spectral flow cytometry still only has a limited number of colors due to the broad fluorescence peaks within a couple of hundred nanometers of available detection range for fluorescence dyes and the spectrometer. Also, spectral flow cytometry requires an increasing number of lasers to increase the number of colors, resulting in high complexity and cost. Another method that breaks the color barrier is mass cytometry based on labeling cells with heavy metal ion tags and time-of-flight mass spectrometry for measurements. Unfortunately, the destructive nature of mass cytometry does not allow its application to temporal tracking or downstream analysis such as RNA sequencing and cultivation after cell sorting.

SUMMARY

This document concerns implementing systems and methods for flow cytometry. The methods comprise: labeling cells of a sample with Raman tags; causing the sample to flow through a microfluidic channel of a flow cytometer through which a laser beam (e.g., a Ti:Sapphire laser beam) passes; detecting Raman signals emitted from the Raman tags while being illuminated by the laser beam; and measuring characteristics of the cells based on the detected Raman signals. A first one of the detected Raman signals may indicate that a first cell of the sample has first characteristic, while a second one of the detected Raman signals may indicate that a second cell of the sample has a second different characteristic.

Each of the Raman signals comprises a plurality of peaks. In some scenarios, at least one peak of a first one of the Raman signals has no overlap with any peaks of other second ones of the Raman signals. The first and second Raman signals are distinguishable from each other based on or by their non-overlapping peaks. In other scenarios, peaks of two Raman signals may overlap. Even in this case, the two Raman signals can be distinguishable from each other based on their different intensity ratios and their linear independence with each other.

In some scenarios (e.g., spontaneous Raman scenarios), the Raman signals may comprise light of different colors in a Raman spectra. The different colors can include any number of colors selected in accordance with a given application. For example, the different colors comprise ten colors, greater than ten color, between one and one hundred forty-six colors, or between ten and one hundred forty-six colors. The present solution is not limited to the particulars of this example. In other scenarios (e.g., FT-CARS scenarios), the Raman spectra is generated by Fourier transformation of the time-domain interferograms.

In some scenarios, the methods also comprise: generating the laser beam by a stimulated Raman scattering related laser source, a coherent anti-stokes Raman scattering related laser source, a Fourier transformed coherent anti-stokes Raman scattering related laser source, dual comb based coherent anti-stokes Raman scattering related laser source(s), or quasi-dual comb based coherent anti-stokes Raman scattering related laser source(s); causing the laser beam to pass through a pulse shaper and be reflected by chirped mirrors prior to passing through the flow cytometer; generating a combined laser beam by combining the laser beam with a continuous wave beam; using an interferometer to divide the combined laser beam into pump-probe pulse pairs; cause the combined laser beam to travel along a path towards the flow cytometer; separating the continuous wave beam of the combined laser beam from the laser beam of the combined laser beam prior to reaching the flow cytometer; and/or using the separated continuous wave beam to control operations of the interferometer.

The implementing systems comprise: a first laser source (e.g., a Ti:Sapphire laser) configured to generate a laser beam; a flow cytometer comprising a microfluidic channel through which a fluid flows, the fluid comprising a plurality of cells suspended therein that are labeled with Raman tags; a detector configured to detect Raman signals emitted from the Raman tags while being illuminated by the laser beam as the laser beam passes through the microfluidic channel; and a computing device configured to determine characteristics of the plurality of cells based on the detected Raman signals. A first one of the detected Raman signals may indicate that a first cell of the sample has first characteristic, while a second one of the detected Raman signals may indicate that a second cell of the sample has a second different characteristic.

The first laser source may comprise a stimulated Raman scattering related laser source, a coherent anti-stokes Raman scattering related laser source, a Fourier transformed coherent anti-stokes Raman scattering related laser source, dual comb based coherent anti-stokes Raman scattering related laser source(s), or quasi-dual comb based coherent anti-stokes Raman scattering related laser source(s).

Each of the Raman signals comprises a plurality of peaks. In some scenarios, at least one peak of a first one of the Raman signals has no overlap with any peaks of other second ones of the Raman signals. The first and second Raman signals are distinguishable from each other based on or by their non-overlapping peaks. In other scenarios, peaks of two Raman signals may overlap. Even in this case, the two Raman signals can be distinguishable from each other based on their different intensity ratios and their linear independence with each other.

In some scenarios (e.g., spontaneous Raman scenarios), the Raman signals may comprise light of different colors in a Raman spectra. The different colors can include any number of colors selected in accordance with a given application. For example, the different colors comprise ten colors, greater than ten color, between one and one hundred forty-six colors, or between ten and one hundred forty-six colors. The present solution is not limited to the particulars of this example. In other scenarios (e.g., FT-CARS scenarios), the Raman spectra is generated by Fourier transformation of the time-domain interferograms.

In some scenarios, the systems also comprises: a pulse shaper through which the laser beam passes and chirped mirrors by which the laser beam is reflected, prior to passing through the flow cytometer; a second laser source configured to generate a continuous wave beam that is combined with the laser beam to produce a combined laser beam, prior to passing through the flow cytometer; and/or an interferometer configured to divide the combined laser beam into pump-probe pulse pairs and cause the combined laser beam to travel along a path towards the flow cytometer. The continuous wave beam is separated from the combined laser beam after exiting the interferometer and prior to reaching the flow cytometer. The separated continuous wave beam may be used to control operations of the interferometer.

BRIEF DESCRIPTION OF THE DRAWINGS

This disclosure is facilitated by reference to the following drawing figures, in which like numerals represent like items throughout the figures.

DETAILED DESCRIPTION

Figure 1:
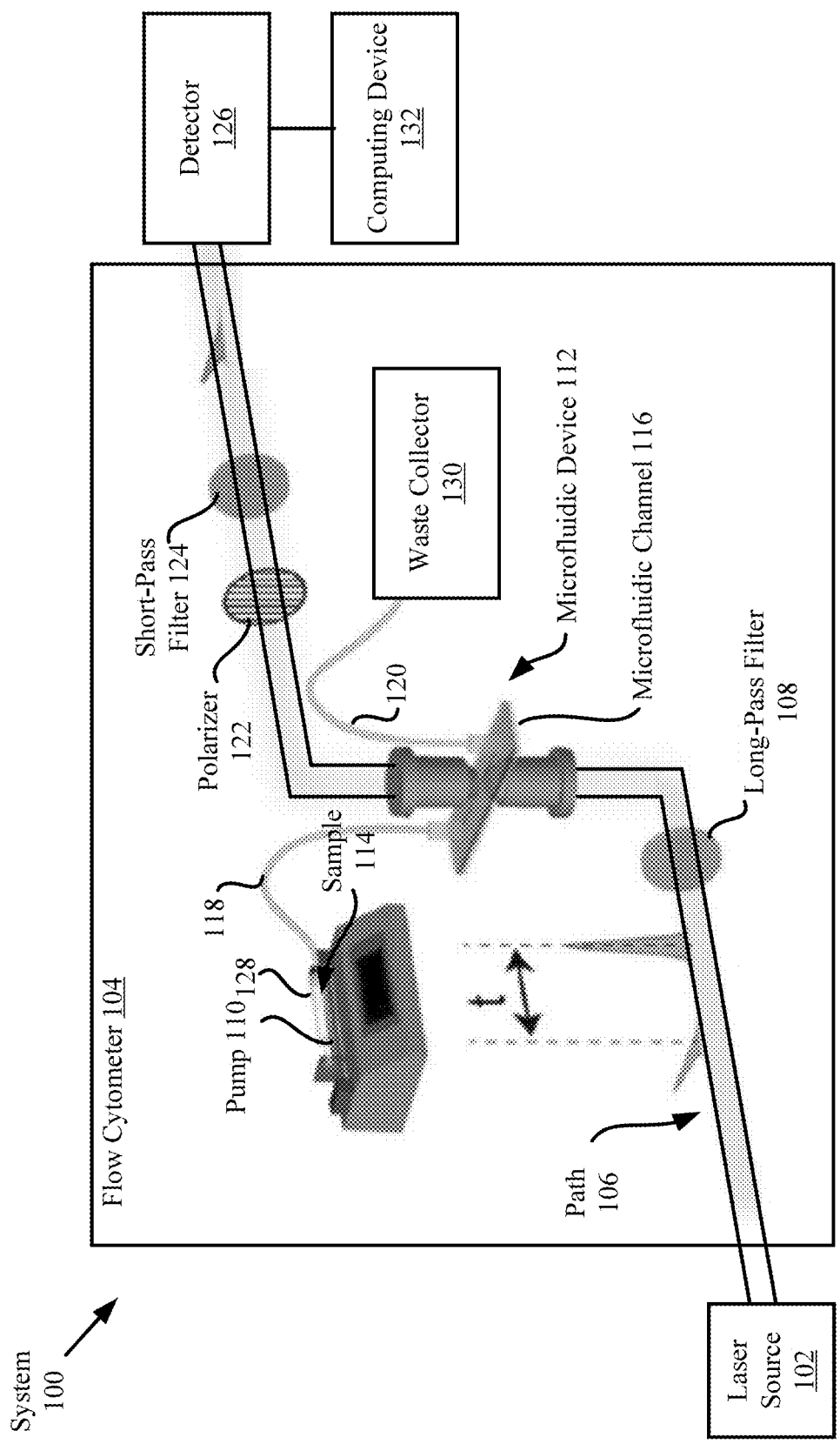
FIG. 1 provides an illustration of a system implementing the present solution.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

The term "spectroscopy" refers to an analysis of an interaction between matter and electromagnetic radiation as a function of a wavelength or frequency of radiation. During this analysis, measurements can be taken of spectra produced when matter interacts with or emits electromagnetic radiation.

The term "Raman spectroscopy" refers to a spectroscopic technique used to determine vibrational modes of molecules. These vibrational modes provide a structure fingerprint by which the molecules can be identified. Raman spectroscopy relies upon inelastic scattering of photons, known as Raman scattering. When a laser light beam interacts with molecular vibrations, the energy in the laser photons is shifted up or down. Raman shift is the difference in frequency between the laser light and the scattered light. The shift in energy provides information that can be used to determine the vibrational modes of molecules. Furthermore, the term of Raman spectroscopy apply to both spontaneous Raman spectroscopy techniques and coherent Raman spectroscopy techniques, such as including but not limited to, Stimulated Raman Scattering (SRS), Coherent Anti-Stokes Raman Scattering (CARS), Fourier Transformed CARS (FT-CARS), a dual comb based CARS (DC-CARS) and/or a Quasi DC-CARS (QDC-CARS). These determinations can be useful for identifying chemical ingredients of tissue samples and/or counting/analyzing cells in large cell populations.

The term "flow cytometry" refers to a technique used to detect and measure physical and chemical characteristics or properties of cells using a flow cytometer. The properties can include the number, size and nucleic acid content of cells. In the flow cytometer, a sample containing cells is suspended in a fluid and caused to pass through a laser beam one cell at a time. The light of the laser beam is scattered when each cell passes therethrough. Thus, the light scattering facilitates the determination of the cell's physical and/or chemical characteristics. The cells may be labeled with fluorescent probes or markers so that light is absorbed and then emitted in a band of wavelengths to further facilitate the determination of the cell's physical and/or chemical characteristics.

The term "Raman tag" refers to molecules (with a functional group) that have vibrational signatures in the Raman signature regions (for example, 100 $cm^{-1}$ to 2200 $cm^{-1}$; 2600 $cm^{-1}$ to 3300 $cm^{-1}$) and Raman silent region of cells (for example, ~2200 $cm^{-1}$ to 2600 $cm^{-1}$). When a Raman tag is illuminated, light is absorbed and then emitted from the Raman tag in a particular band of wavelengths. The emitted light is referred to as a Raman signal and/or a shifted Raman signal. In some scenarios (e.g., spontaneous Raman scenarios), the Raman signals may comprise light of different colors in a Raman spectra. Thus, each Raman signal comprises light of a respective color in a Raman spectra. For example, a first Raman signal comprises blue light and a second Raman signal comprises green light. The different colors can include any number of colors selected in accordance with a given application. For example, the different colors comprise ten colors, greater than ten color, between one and one hundred forty-six colors, or between ten and one hundred forty-six colors. The present solution is not limited to the particulars of these examples. In other scenarios (e.g., FT-CARS scenarios), the Raman spectra is generated by Fourier transformation of the time-domain interferograms.

The terms "Raman-active dot" or "Rdot" refers a nanoparticle containing densely packed Raman tags. The nanoparticle can include, but are not limited to, polymer nanoparticles.

As noted above, flow cytometry is an indispensable tool in biology and medicine for counting and analyzing cells in large heterogeneous populations. Flow cytometry identifies multiple characteristics of every single cell, typically via fluorescent probes or markers that specifically bind to target molecules on the cell surface or within the cell. However, flow cytometry has a critical limitation: the color barrier. The number of chemical traits that can be simultaneously resolved is typically limited to several due to the spectral overlap between fluorescence signals from different fluorescent probes or markers. The present document describes a solution for overcoming these drawbacks of conventional flow cytometry.

The present solution generally concerns systems and methods for color-scalable flow cytometry with Raman tags in conjunction with the ultra-high throughput (measurement speed) of Coherent Raman Spectroscopy (CRS). The methods involve performing color-scalable flow cytometry based on coherent Raman flow cytometry with Raman tags to break the color and cytometer throughput barriers. This is made possible by combining (i) a high-throughput broadband Raman flow cytometer based on Fourier Transform CARS (FT-CARS) (which employs a time-domain repetitive pump-probe scheme for rapid coherent anti-Stokes Raman scattering (CARS) measurements), (ii) resonance-enhanced cyanine-based Raman tags and (iii) Rdots.

As a proof-of-concept demonstration, multiplex flow cytometry was performed for MCF-7 breast cancer cells. In order to realize multiplex measurements, a pallet of cyanine-based Raman tags was developed (including 8 newly synthesized cyanine molecules) whose Raman spectra are linearly independent in the fingerprint region (for example, 400-1600 $cm^{-1}$). To enhance Raman signals from the Raman tags, different Rdots were produced which were composed of the cyanine-based Raman tags in polymer nanoparticles whose detection limit is as low as 15 nM for a short FT-CARS signal integration time of 420 μs. The MCF-7 breast cancer cells were stained by the different Rdots, and the multiplex flow cytometry was performed in accordance with the present solution. The multiplex flow cytometry had a high classification accuracy of 98.0%.

The present solution can also be used for large-scale time-course analysis of endocytosis. This can be achieved by exposing cells to different Rdots at different timings and decoding their time-varying uptake of Rdots by spectral fitting. An advantage of the present multiplex flow cytometry with Raman tags over spectral flow cytometry and mass cytometry is that the number of molecules that can be simultaneously measured can theoretically scale up to one hundred forty or even more with a single excitation laser and a single detector without the need for increasing instrument size, cost, and complexity and for destroying cells.

Referring now to FIG. 1, there is provided an illustration of a system 100 implementing the present solution. System 100 comprises a laser source 102, a flow cytometer 104 and a detector 120. The laser source 102 is configured to produce a laser beam. The laser beam is caused to travel along path 106 towards the flow cytometer 104. The flow cytometer 104 is generally configured to detect and measure physical and chemical characteristic or properties of a sample 114. The sample 114 can include, but is not limited to, a population of cells (for example, tissue cells or cancer cells).

The flow cytometer 104 comprises a long-pass filter 108. The long-pass filter 108 is provided to reduce the background signal. Thereafter, the laser beam travels to a microfluidic device 112. The microfluidic device comprises or is coupled to a reservoir 118 in which the sample 114 is suspended in a fluid. The reservoir 118 can include, but is not limited to, a syringe or other containing structure. The fluid is caused to flow from the reservoir 118 through a microfluidic channel 116 and into a waste collector 130 via a pump 110 and tubing 118, 120. One cell of the sample 114 is caused to pass through the microfluidic channel 116 at any given time. The fluid can include, but is not limited to, a sheath fluid, water and/or any other benign liquid.

The laser beam is scattered when the laser beam interacts with the sample 114 due to the sample's molecular vibrations. Thus, the scattered light is characteristic of the cell and its components. The scattered light is detected by the detector 126. When such a detection is made, the detector 126 generates a photocurrent. The difference of light scattering intensities in the data allows computing device 132 to analyze cell type and characteristics.

Each cell may be labeled with Raman tags or Rdots so that light is absorbed and then emitted in a particular band of wavelengths. In some scenarios, the Raman tags employed by system 100 can comprise cyanine-based Raman tags having the molecular structures and Raman spectra shown in FIG. 4. The Raman spectra represents the band of colors produced by separation of components of light by their different degrees of refraction according to wavelength. The present solution is not limited to cyanine-based Raman tags. Other types of Raman tags can be used. The Raman tags and Rdots bind to target molecules on the cell surface or within the cell. Each Raman tag has a characteristic peak excitation and emission wavelength. The light emitted from a Raman tag is referred to as a Raman signal or a shifted Raman signal.

After passing through the sample 114, the laser beam is filtered via optical filters 122, 124. The optical filters can include, but are not limited to, polarizers, short-pass filters and/or long pass filters (not shown). The present solution is not limited to the order in which the optical filters are shown in FIG. 1. For example, in other scenarios, the polarizer 122 resides after the short-pass filter 124. The polarizer 122 removes the spurious or noise signals from the shifted Raman signal. The short-pass filter 124 is configured to isolate the shifted Raman signal from the incident laser beam and allow the short wavelength signal components to pass (e.g., green wavelengths). The short wavelength components of the shifted Raman signal are then caused to travel to the detector 126.

Detector 126 converts analog measurements of the shifted Raman signals into digital signals that can be processed by a computing device 132. The digital signal can be used to obtain quantifiable data about the sample 114 such as a number of each type of cell thereof. For example, the difference of wavelength response in the data allows computing device 132 to analyze cell type and characteristics.

Figure 2:
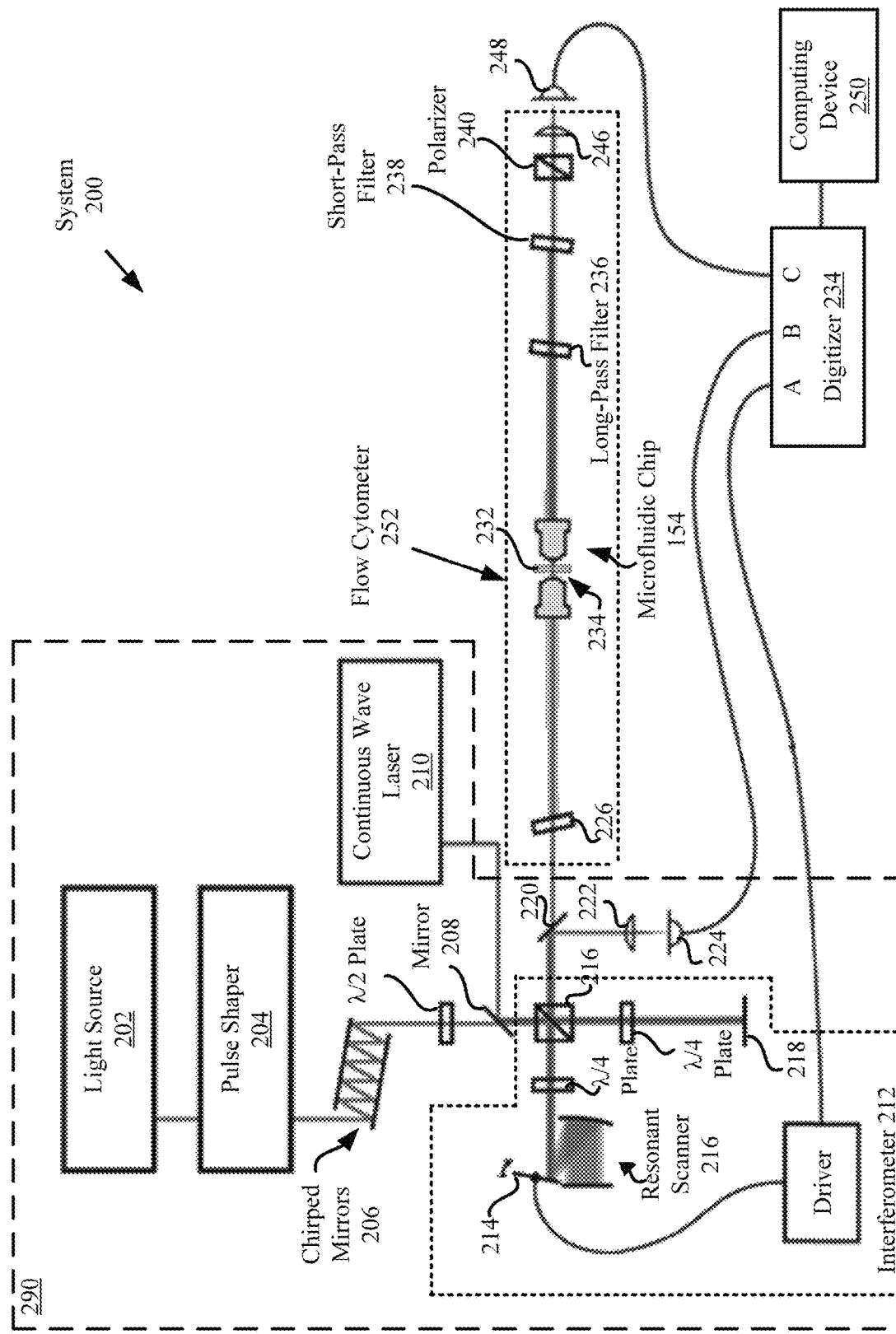
FIG. 2 provides an illustration of another system implementing the present solution.

Referring now to FIG. 2, there is provided an illustration of another system 200 implementing the present solution. System 200 shows an instrumentation setup for an FT-CARS application. System 200 comprises a light source 202. Light source 202 can include, but is not limited to, a laser based on vibronic titanium doped sapphire crystal (Ti:Saphire crystal). This laser is referred to as a Ti:Sapphire laser. The Ti:Sapphire laser can include, but is not limited to, a taccor power laser available from Cambridge Technology of Bedford Massachusetts. The Ti:Sapphire laser emits a laser beam created by pumping the Ti:Sapphire crystal with an exciting laser beam at a shorter wavelength. The exciting laser beam may be generated by a Diode-Pumped Solid-State (DPSS) laser. The laser beam emitted from the Ti:Sapphire laser is referred to herein as a Ti:Sapphire laser beam.

For dispersion compensation, the Ti:Sapphire laser beam is caused to pass through a pulse shaper 204 and be reflected several times by a pair of chirped mirrors 206. The light pulses of the Ti:Sapphire laser beam are then divided into pump-probe pulse pairs by an interferometer 212. Interferometers are well known instruments which merge two sources of light to create an interference pattern.

Prior to entering the interferometer 212, the Ti:Sapphire laser beam is combined with a Continuous Wave (CW) laser beam via a mirror 208 to produce a combined laser beam. The CW laser beam is generated by a Continuous Wave (CW) laser 210. The CW laser 210 can include, but is not limited to, a diode laser available from QD Laser, Inc. of Japan.

The interferometer 212 can include, but is not limited to, a Michelson interferometer and/or any other known or to be known interferometer. The Michelson interferometer is configured to produce interference fringes by splitting the combined light beam into two parts and then recombining them after they have traveled different optical paths. The Michelson interferometer comprises a Polarizing Beam Splitter (PBS) 216. When the combined laser beam strikes the PBS 216, it is split into two beams—a first half of the combined laser beam is reflected to the side and a second half of the combined laser beam passes through a mirror. The first and second halves beams are caused to travel different optical paths: a first optical path going to a mirror 214 and a second optical path going to mirror 218. The first and second halves of the combined laser beam are respectively reflected back towards the PBS 216 via mirrors 214, 218. Mirror 214 is movable and mirror 218 is stationary. The reflected laser beams are recombined at the PBS 216 and caused to travel towards mirror 220.

In the first path of the interferometer 212, a resonant scanner 216 is used to rapidly modulate an optical path length of the optical system whereby an electronic synchronization signal is generated. Any known or to be known resonant scanner can be used herein. The resonant scanner can include, but is not limited to, resonant scanner available from Cambridge Technology of Bedford Massachusetts. The electronic synchronization signal is caused to travel to a first channel A of a digitizer 234.

Mirror 220 causes the CW laser beam to be separated from the Ti:Sapphire laser beam. The CW laser beam is then focused onto a photodetector 224 via a lens 222. The photodetector 224 provides an electrical signal to a second channel B of the digitizer 234 when the CW beam is detected by the photodetector 224.

The Ti:Sapphire laser beam is then caused to travel to a flow cytometer 252. Flow cytometer is similar to flow cytometer 104 of FIG. 1. Pump, tubing and waste collector are not shown in FIG. 2 for simplicity of illustration. At the flow cytometer 252, the Ti:Sapphire laser beam is passed through a long-pass filter 226 to reduce the background signal. Thereafter, the Ti:Sapphire laser beam travels to a microfluidic chip 254. The microfluidic chip 254 comprises a sample 232 flowing in a microfluidic channel 234. The pump-probe pulse pairs of the Ti:Sapphire laser beam are focused onto the sample to generate an FT-CARS signal.

The FT-CARS signal is caused to travel to a lens 246 via optical filter(s) 236, 238, 240. Optical filter 236 can comprise a long-pass filter that is configured to remove spurious and/or noise components of the FT-CARS signal. Optical filter 238 can comprise a short-pass filter 238 that is configured to isolate a blue-shifted FT-CARS signal from the incident light. Optical filter 240 can comprise a polarizer configured to allow light waves of a specific polarization pass through to lens 246.

Figure 3:
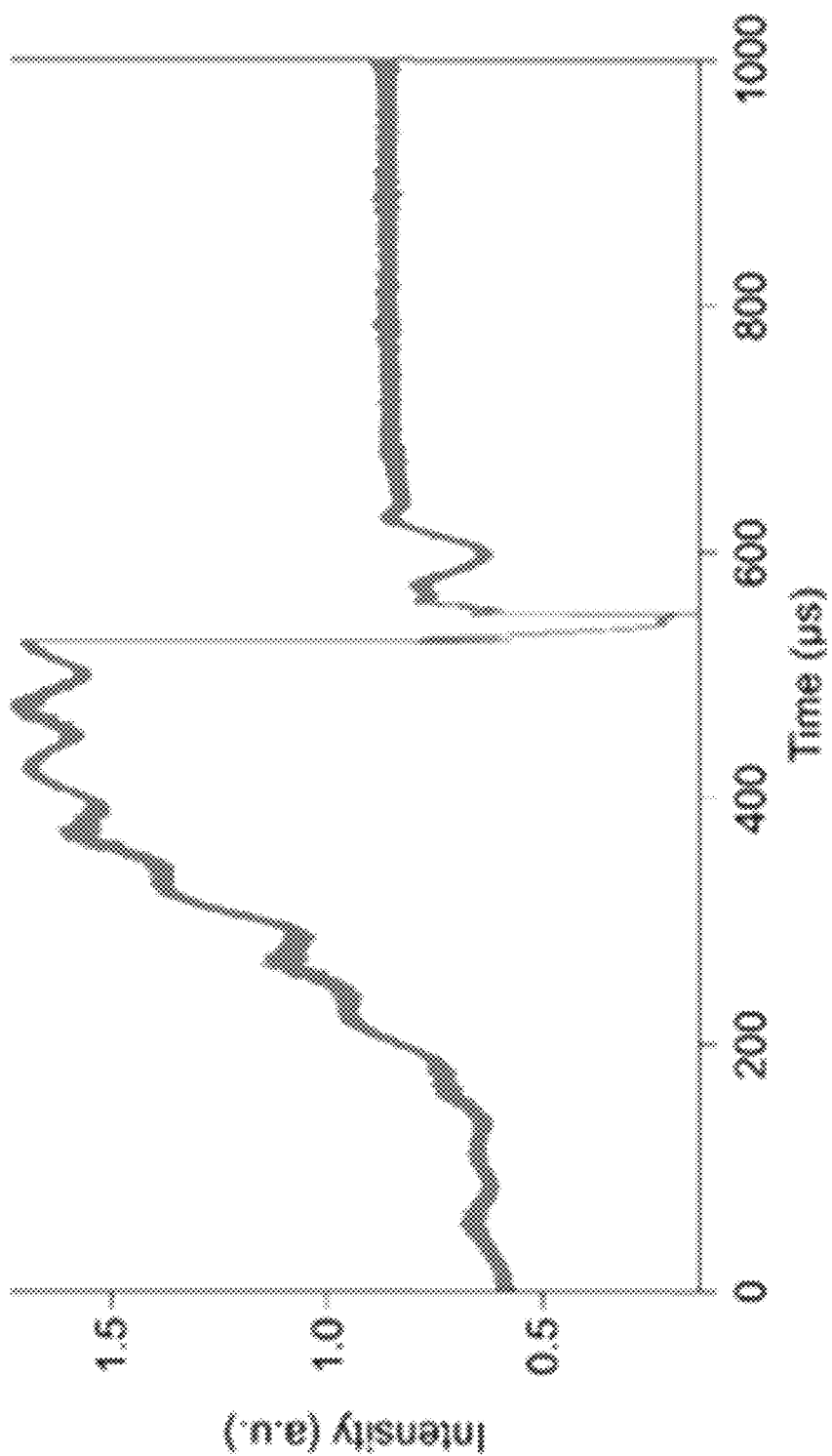
FIG. 3 provides a graph showing an illustrative time domain Fourier-transform coherent anti-Stokes Raman scattering (FT-CARS) signal.

Lens 246 causes the FT-CARS signal to be focused onto an avalanche photodetector 248. The avalanche photodetector 248 provides an electrical signal to a third channel C of the digitizer 234 when the FT-CARS signal is detected by the avalanche photodetector 248. This electrical signal facilitates sampling of the FT-CARS signal at a sampling rate of one hundred million samples per second. A graph showing an illustrative time-domain FT-CARS signal is provided in FIG. 3.

The digitizer 234 acquires data when a voltage of the electrical signal at channel C exceeds a threshold voltage. For each cell, the digitizer 234 is capable of acquiring data for at least one hundred thousand samples per millisecond. The signal at channel B is used to control operations of the interferometer 212. For example, the signal at channel B is used to calibrate a pump-probe delay in the interferometer 212. The present solution is not limited in this regard.

Figure 36:
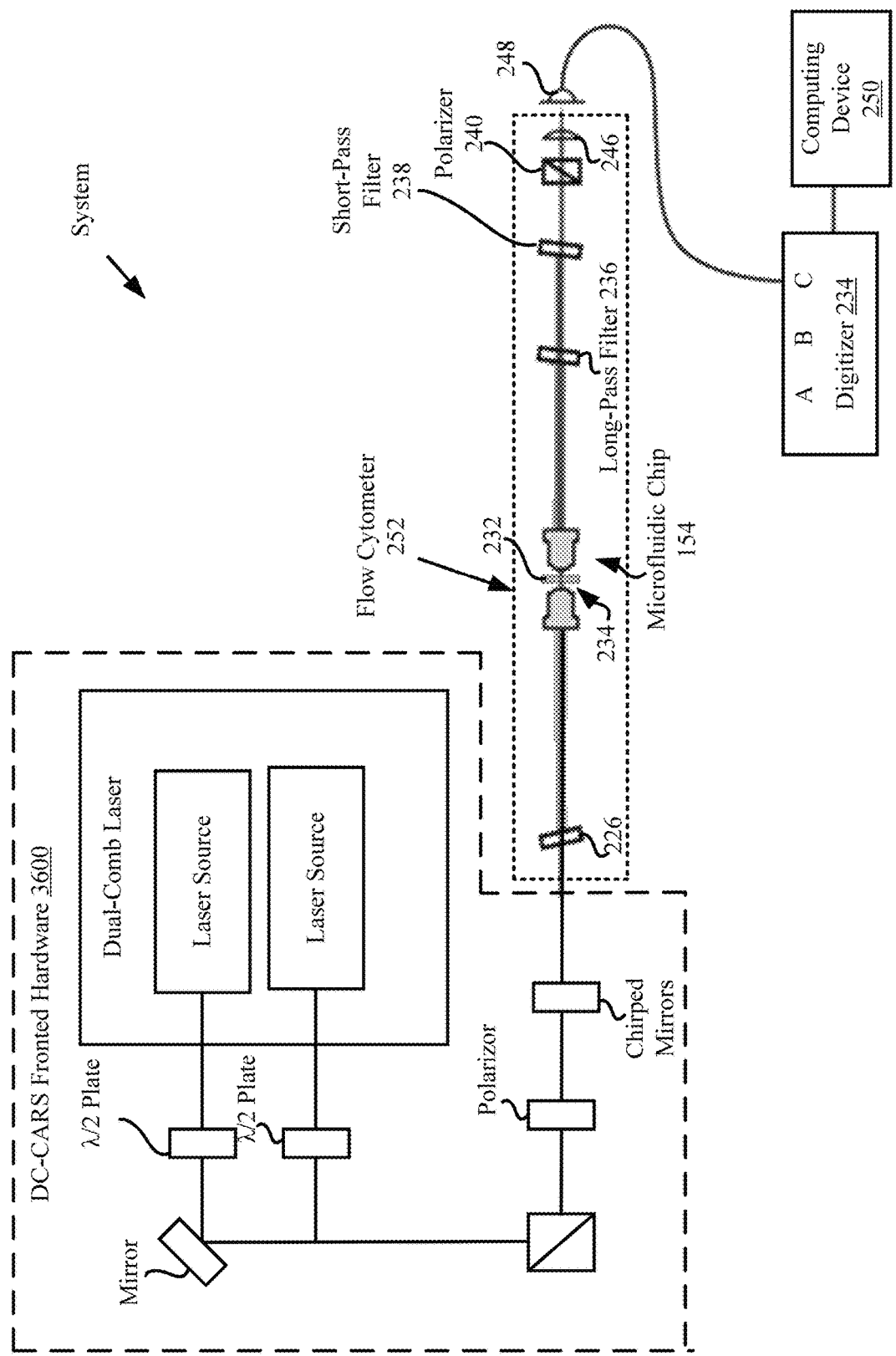
FIG. 36 provides an illustration of another system implementing the present solution.
Figure 37:
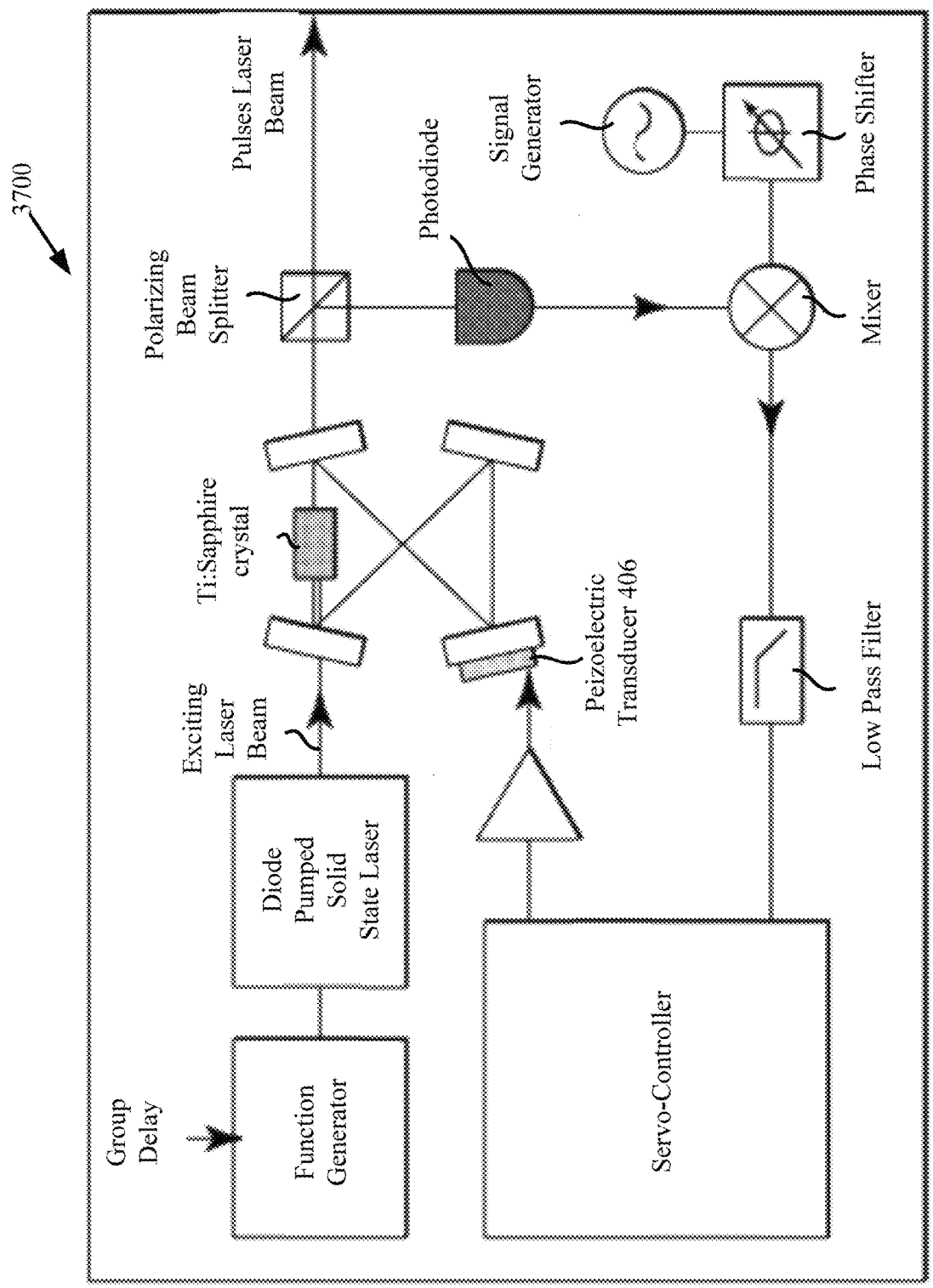
FIG. 37 provides an illustration of a laser source which can be used with the flow cytometer of the present solution.

The present solution is not limited to architecture shown in FIG. 2. The flow cytometer 252 can be used with other frontend equipment. This other frontend equipment can be selected in accordance with particular applications such as, for example, SRS applications, CARS applications, DC-CARS applications and/or QDC-CARS applications. For example, the components in block 290 can be replaced with any known or to be known SRS laser, driver and/or controller. Alternatively, the components in block 290 can be replaced with the components in block 3600 as shown in FIG. 36. The DC-CARS frontend hardware 3600 is described in relation to FIG. 2 of International PCT Patent Application No. PCT/US2021/048006 ("the '006 application) which is incorporated herein by reference in its entirety. The DC-CARS frontend hardware 3600 is also referred to herein as a DC-CARS laser source. Similarly, the components in block 290 can be replaced with the components in block 3700 shown in FIG. 37. Block 3700 represents a QDC-CARS laser source which is described in relation to FIG. 4 of the '006 application, which is incorporated herein by reference in its entirety. The SRS laser/driver/controller, DC-CARS laser source 3600 and/or QDC-CARS laser source 3700 could also be employed in block 102 of FIG. 1.

Figure 4:
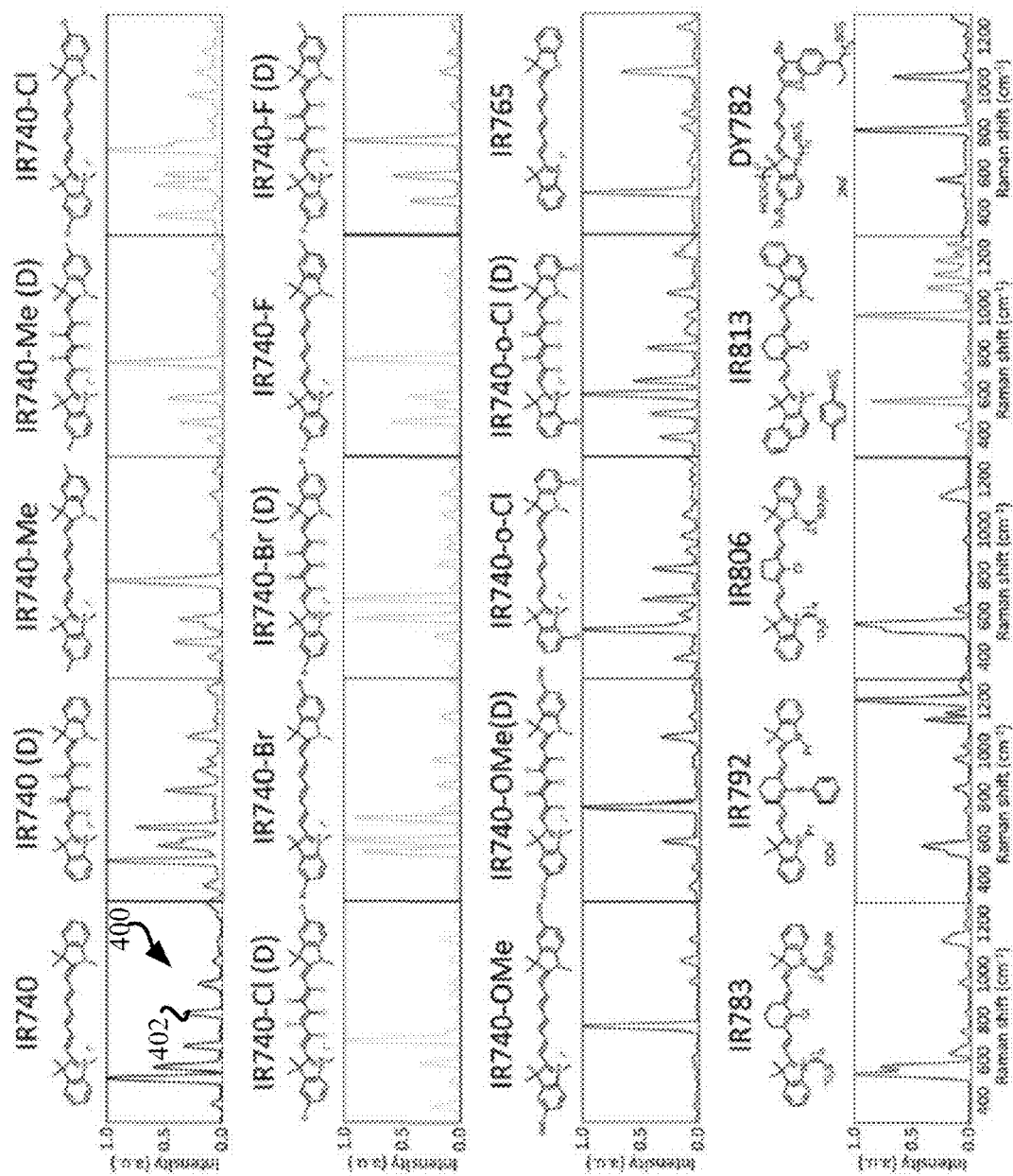
FIG. 4 provides graphs showing molecular structures and Raman spectra of cyanine-based Raman tags. Each spectrum was obtained with the system of FIG. 2 at a concentration of 100 μM with a measurement duration of 0.8 seconds.

FIG. 4 shows the molecular structures and Raman spectra of twenty cyanine-based Raman tags. Each of the Raman signals produced by the Raman tags comprises a plurality of peaks. In some scenarios, at least one peak of a first one of the Raman signals has no overlap with any peaks of other second ones of the Raman signals. The first and second Raman signals are distinguishable from each other based on or by their non-overlapping peaks. In other scenarios, peaks of two Raman signals may overlap. Even in this case, the two Raman signals can be distinguishable from each other based on their different intensity ratios and their linear independence with each other.

Figure 34:
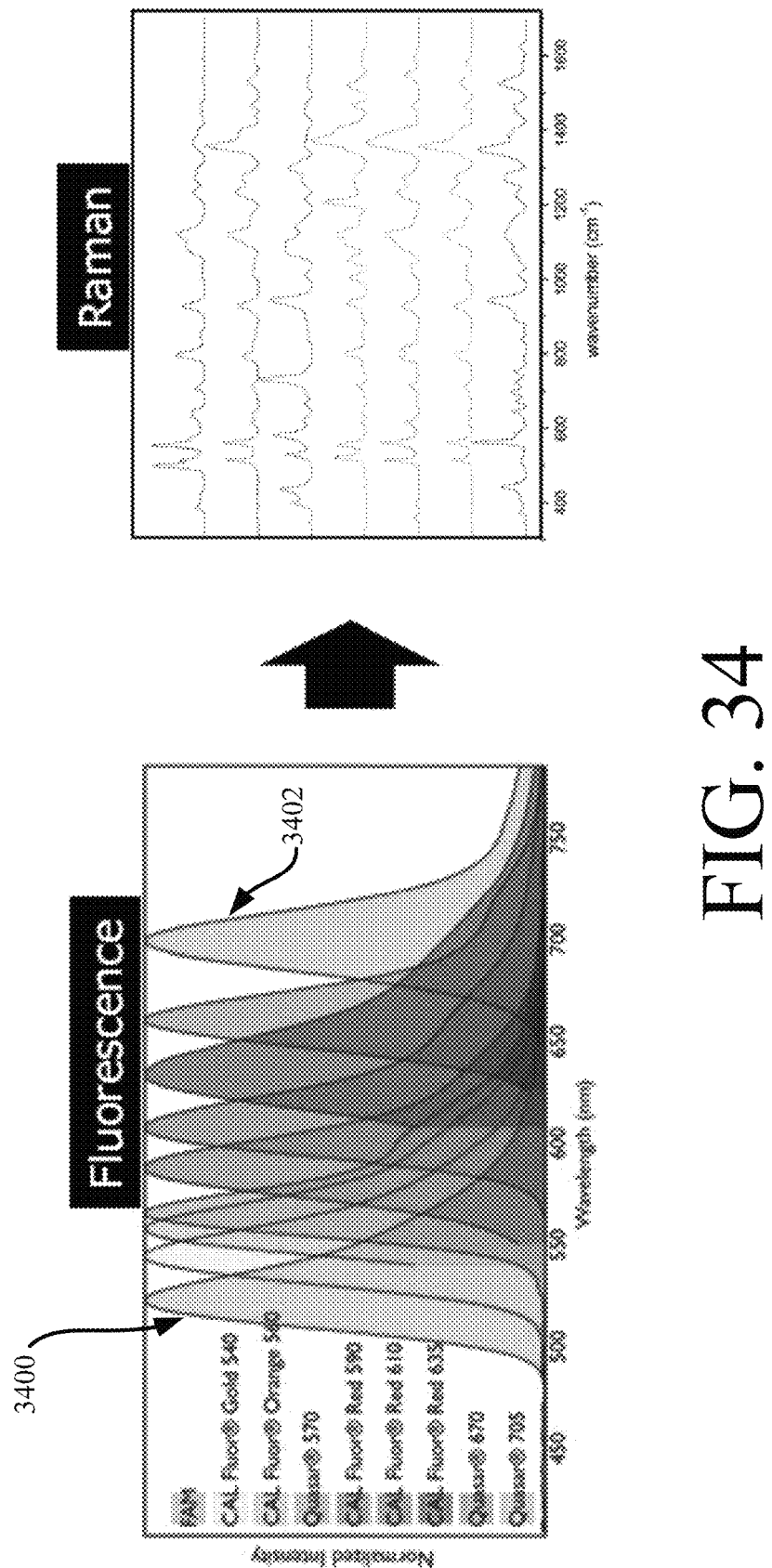
FIG. 34 provides an illustration that is useful for understanding the differences between fluorescent tags and Raman tags.

As seen in FIG. 4, a Raman tag has an associated shifted Raman signal 400 with at least one peak 402 that does not overlap with any peaks of shifted Raman signals associated with all other Raman tags. Thus, the shifted Raman signal for this Raman tag can be detected and distinguished from shifted Raman signals from other Raman tags (even if one or more peaks of the shifted Raman signals overlap). In contrast, florescent tags each produce a single peak 3400 (as shown in FIG. 34) which overlaps with the peaks 3402 of the other fluorescent tags. So, even if the entire spectrum is measured, component separation becomes difficult as the number of colors increases. Therefore, it is generally difficult to detect ultra-multicolor (>20 colors) using fluorescence. On the other hand, the Raman spectrum has a narrower peak width as compared to that of the fluorescence spectrum, and the Raman signals have more complex signal structures (each defined by a plurality of narrow sharp peaks) as compared to that of the fluorescence signals (each defined by a single wide peak). In effect, a much larger number of colored light can be detected using Raman tags. Up to nine colors of light can be detected using fluorescent tags as shown in FIG. 34. In contrast, light of W colors can be detected using Raman tags, where W is any integer equal to or greater than one. In some scenarios, W is ten, one hundred forty-six, any number greater than nine, or any number between nine and one hundred forty-six. The present solution is not limited in this regard.

A Raman tag IR740 produces a Raman signal comprising grey colored light and a wavelength infrared (IR) 740 nm. A Raman tag IR740 (D) produces a Raman signal comprising red colored light and a wavelength IR 740 nm. A Raman tag IR740-Me produces a Raman signal comprising dark orange colored light and a wavelength IR 740 nm. A Raman tag IR740-Me (D) produces a Raman signal comprising light orange colored light and a wavelength IR 740 nm. A Raman tag IR740-Cl produces a Raman signal comprising yellow colored light and a wavelength IR 740 nm. A Raman tag IR740-Cl (D) produces a Raman signal comprising green colored light and a wavelength IR 740 nm. A Raman tag IR740-Br produces a Raman signal comprising green colored light and a wavelength IR 740 nm. A Raman tag IR740-Br (D) produces a Raman signal comprising green colored light and a wavelength IR 740 nm. A Raman tag IR740-F produces a Raman signal comprising blue colored light and a wavelength IR 740 nm. A Raman tag IR740-F (D) produces a Raman signal comprising blue colored light and a wavelength IR 740 nm. A Raman tag IR740-OMe produces a Raman signal comprising purple colored light and a wavelength IR 740 nm. A Raman tag IR740-OMe (D) produces a Raman signal comprising purple colored light and a wavelength IR 740 nm. A Raman tag IR740-o-Cl produces a Raman signal comprising purple colored light and a wavelength IR 740 nm. A Raman tag IR740-o-CL (D) produces a Raman signal comprising pink colored light and a wavelength IR 740 nm. The Raman tag IR765 produces a Raman signal comprising brown colored light and a wavelength IR 765 nm. A Raman tag IR783 produces a Raman signal comprising green colored light and a wavelength IR 783 nm. A Raman tag IR792 produces a Raman signal comprising brown colored light and a wavelength IR 792 nm. A Raman tag IR806 produces a Raman signal comprising pink colored light and a wavelength IR 806 nm. A Raman tag IR813 produces a Raman signal comprising pink colored light and a wavelength IR 813 nm. A Raman tag DY782 produces a Raman signal comprising grey colored light and a wavelength IR 782 nm.

The cyanine-based Raman tags are produced using cyanine dyes consisting of 7-methine structures, which show strong absorption around 740 nm. As the flow cytometer 252 is pumped by a Ti:Sapphire laser emitting 750-850-nm light, Raman signals of the cyanine-based Raman tags are strongly enhanced by their electronic resonance in 740 to 820 nm. The strategy is to increase the number of colors without sacrificing the strong resonance Raman enhancement. This is achieved by adding substituents (-Me, —Cl, —Br, —F, —OMe) at the edge of the conjugated system of an IR740 molecule's skeletal structure. Hydrogens in the tetraene unit are substituted by deuteriums to shift Raman signals and double the number of the dyes without changing the absorption wavelength. With the same strategy, the number of colors may be further increased by introducing different substituents, different isotopes at different positions.

Figure 5:
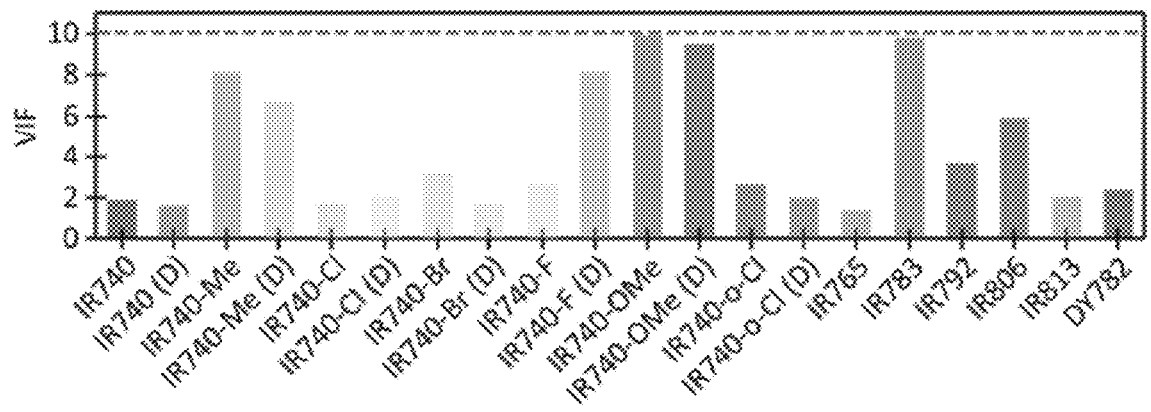
FIG. 5 provides Variance Inflation Factor (VIF) values of twenty cyanine-based Raman tags.

To use the synthesized cyanine-based Raman tags for multiplex measurements, their Raman spectra need to be linearly independent. To quantitatively evaluate the linear independence of the Raman spectra of the Raman tags of FIG. 4, their Variance Inflation Factor (VIF) values are computed. The computed VIF values are shown in FIG. 5. Each VIF value represents a measure of the amount of multicollinearity in a set of multiple regression variables.

When the VIF is applied to Raman spectroscopy (with the VIF value of the optical spectrum of a molecule exceeding a threshold of ten), its spectrum can be reproduced by a linear superposition of the spectra of other molecules. Among the VIF values of the Raman tags, IR740-OMe shows the highest value of 10.07 while the other Raman tags show VIF values lower than 10.00. These results show the linear independence of the spectra of cyanine-based Raman dyes.

Figure 6:
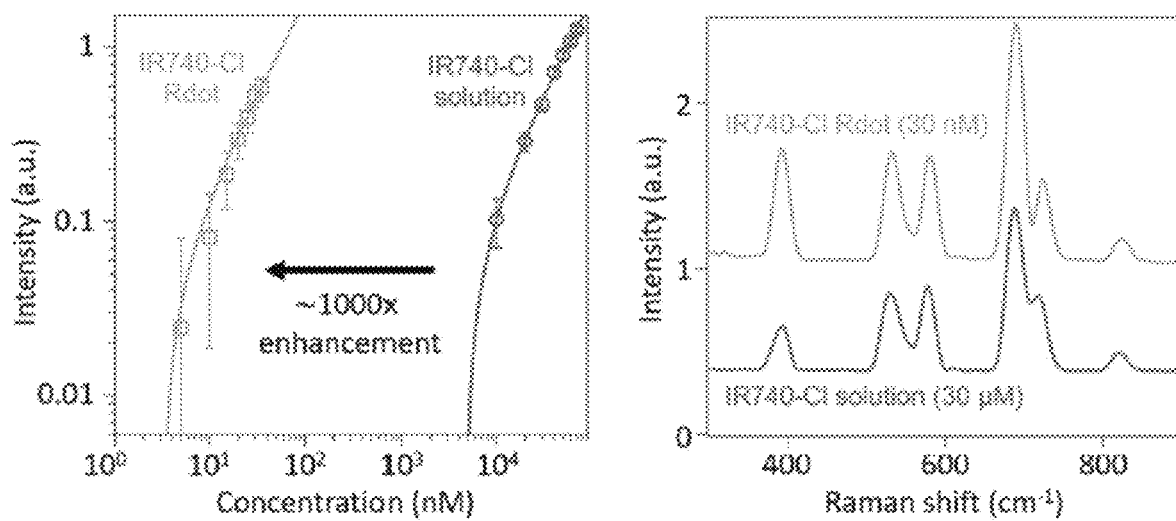
FIG. 6 provide a left graph showing concentration dependance of Raman intensities of IR740-Cl methanolic solutions and Rdot-IR740-Cl (measurement time 0.42 ms). The error bars indicate the standard deviations of the measured FT-CARS intensities. The right graph shows the Raman spectra of IR740-Cl methanolic solutions and Rdot-IR740-Cl (measurement time 0.8 s).

Next, the limit of detection (LoD) for FT-CARS spectroscopy with each cyanine-based Raman tag can be evaluated by measuring the FT-CARS spectra of IR740-Cl at various concentrations shown by the circles in the left graph of FIG. 6. For a spectral acquisition time of 420 µs, which is the typical duration of a single-cell measurement in FT-CARS flow cytometry, the LoD of IR740-Cl is found to be 8 µM. This value is much lower than the typical LoD in coherent Raman spectroscopy in the non-resonance regime.

The Raman tags may be added to 40-nm polystyrene (PS) nanoparticles to prepare Rdots. As shown in the left graph of FIG. 5, the LoD of the Rdots is found to be 12 nM, which is >600 times lower than the LoD of the original cyanine-based Raman tag. The Raman spectra obtained from free IR740-Cl molecules dissolved in methanol and Rdots composed of IR740-Cl are shown in the right graph of FIG. 6. While the relative peak intensities of the Rdots are slightly different, their overall spectral profiles are preserved upon the incorporation of the Raman tags into Rdots. This implies that the prepared Rdots retained low spectral multicollinearity seen in the free Raman tags dissolved in methanol.

Example 1

Figure 7:
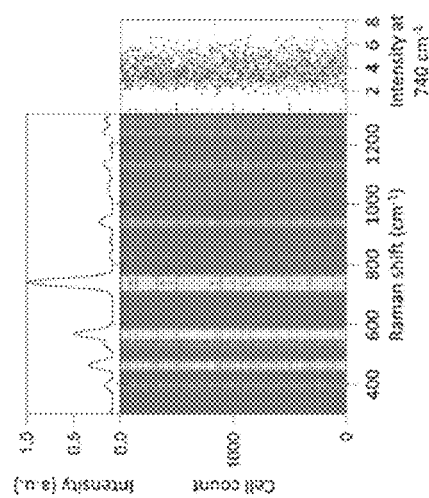
FIG. 7 provides a graph showing evidence for high reproducibility of the FT-CARS flow cytometry measurements.
Figure 8:
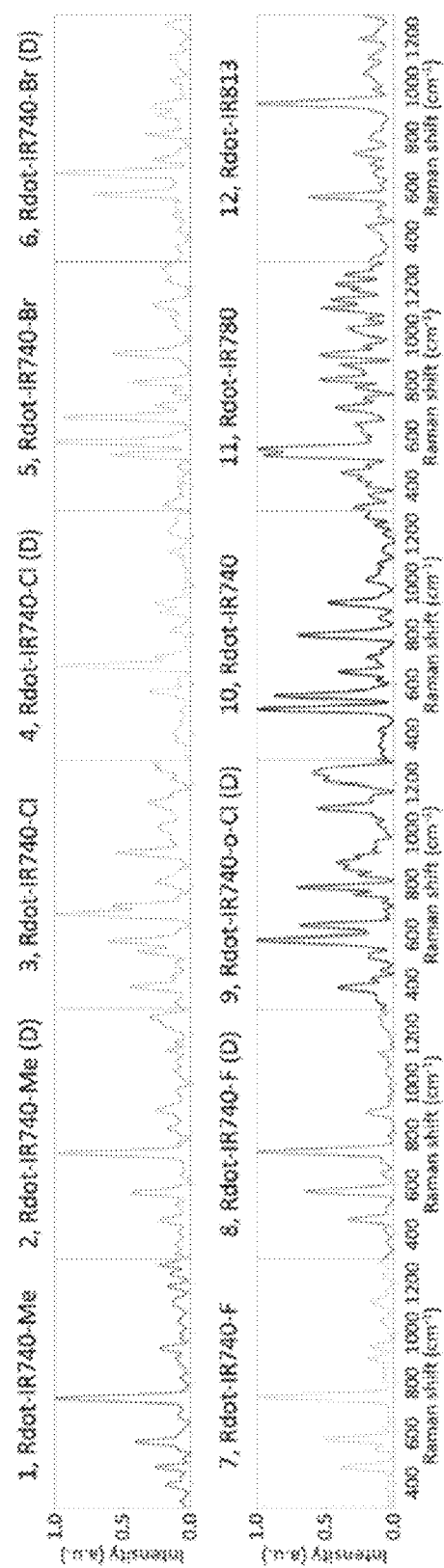
FIG. 8 provides graphs showing single-cell Raman spectra of MCF-7 cells stained by twelve different colors of Rdots.
Figure 9:
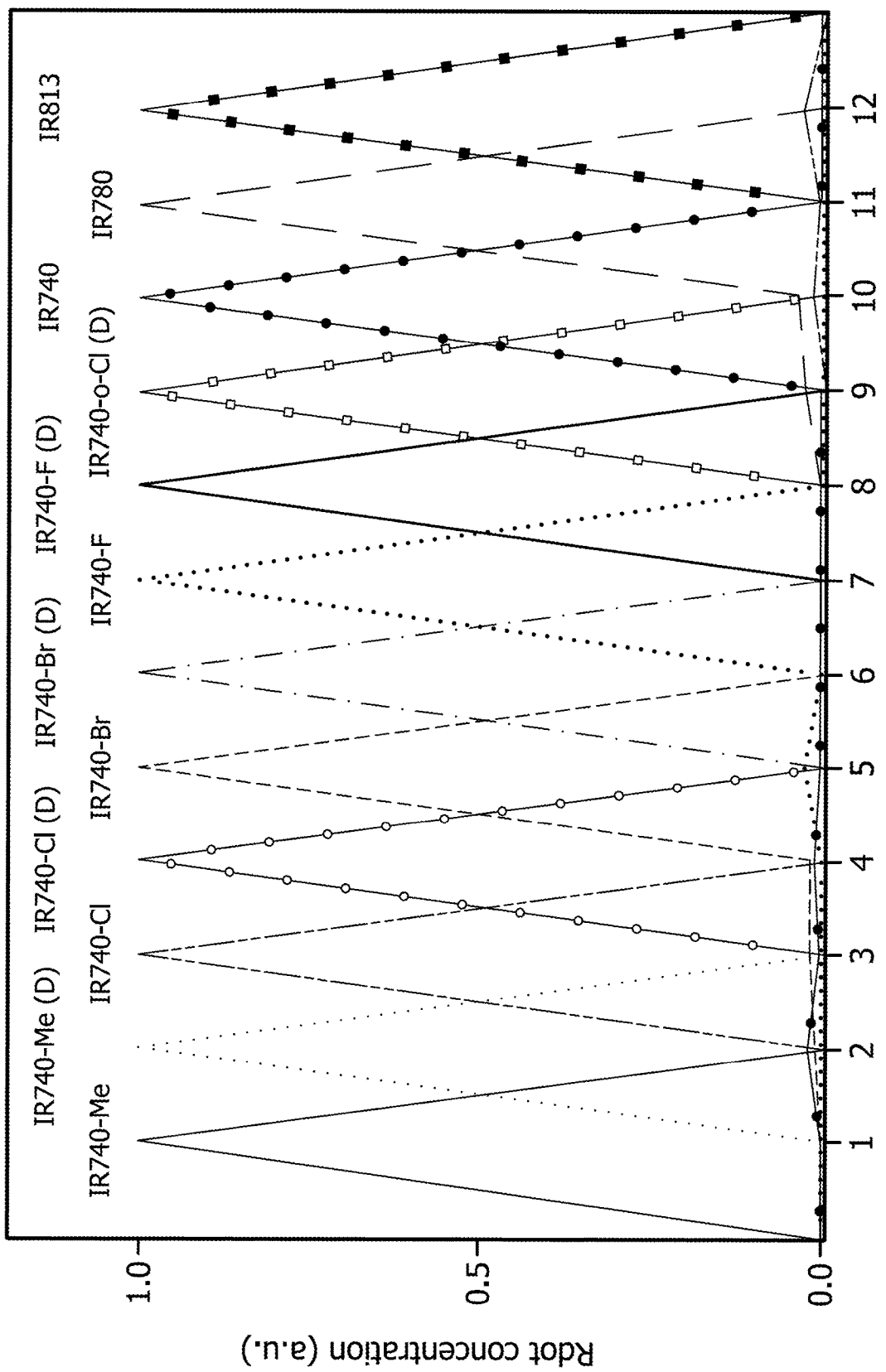
FIG. 9 provides a graph showing spectral unmixing of the single-cell spectra shown in FIG. 7.

To demonstrate multiplex flow cytometry with Raman tags, measurements were performed for MCF-7 breast cancer cells stained by twelve Rdots using system 100 of FIG. 1. The Rdots were incorporated into the cells through endocytosis by culturing them in media containing the prepared Rdots. For each color, Raman spectra of one thousand single cells were obtained at throughputs of 20-50 cells/s with a spectral acquisition time of ~750 µs/cell (18 spectra/cell). The Raman spectra of the cells stained by IR740-Me (N=2,000) are shown in FIG. 7 (their intensities at 740 cm$^{-1}$ and the average spectrum). FIG. 7 shows the high reproducibility of the FT-CARS flow cytometry measurements. Typical Raman spectra obtained from the single cells stained by the twelve different Rdots is shown in FIG. 8, in which the spectral profiles are distinct from each other. To quantify the concentrations of Rdots in the cells, the obtained single-cell spectra were fitted with a model spectrum expressed by $\Sigma_i C_i S_i$, where $C_i$ and $S_i$ the relative concentration and reference Raman spectrum of the i-th Rdot, respectively. FIG. 9 shows the $C_i$ values obtained from the spectra of twelve single cells stained by the twelve Rdots, showing that each single-cell spectrum was well reproduced solely by one reference spectrum.

Figure 10:
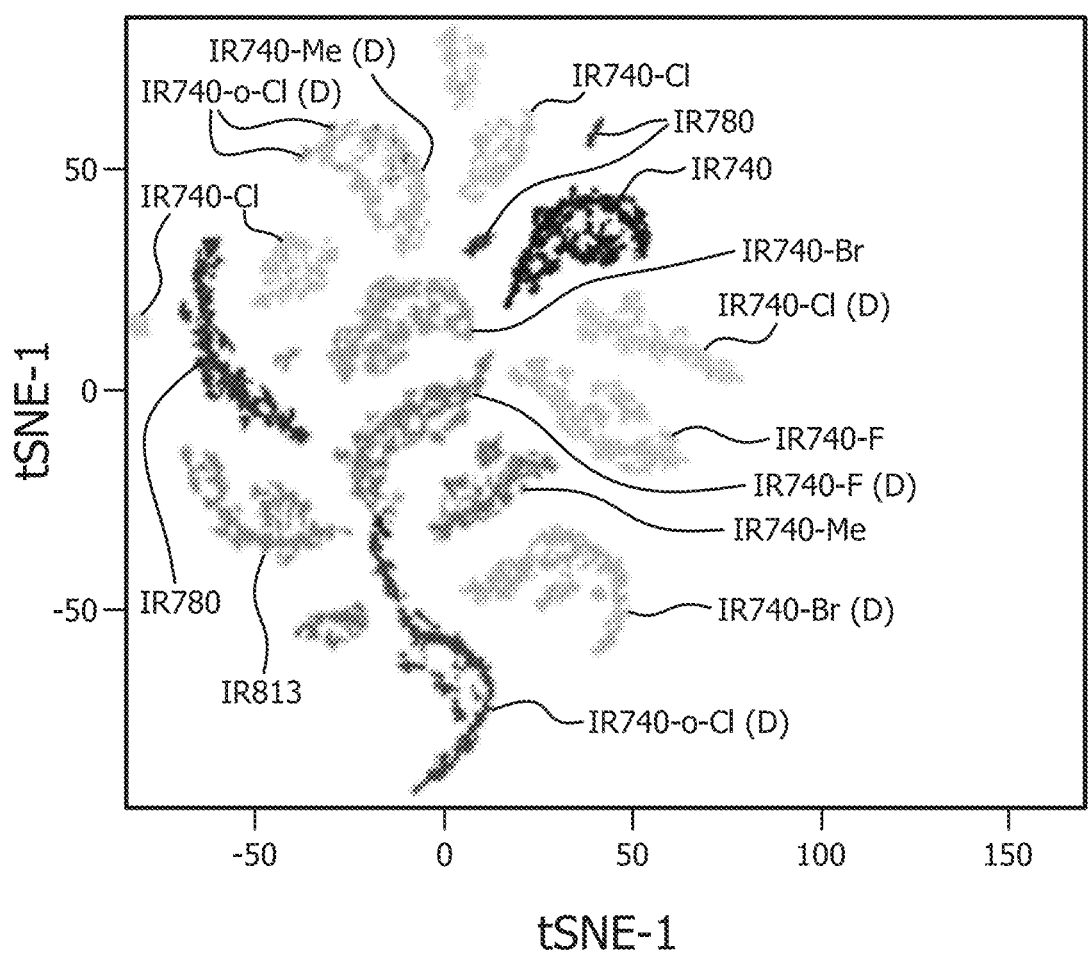
FIG. 10 provides an illustration of t-SNE projection of 11,777 single-cell Raman spectra obtained from MCF-7 cells stained by twelve different Rdots.
Figure 11:
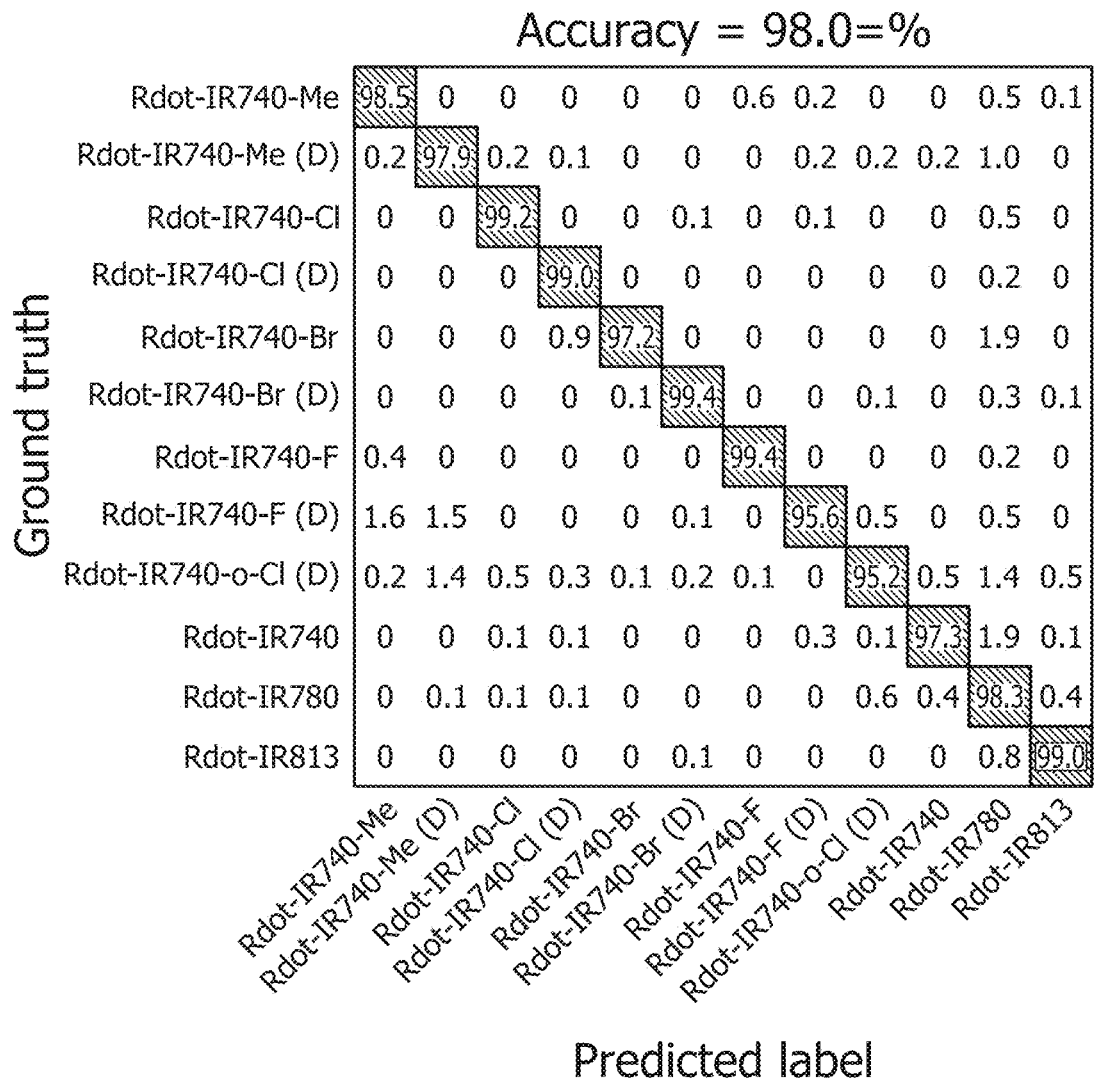
FIG. 11 provides a conclusion matrix for the classification of Rdots based on the obtained single-cell Raman spectra.

To demonstrate the applicability of the present method to large-scale analysis, all the obtained spectra (N=11,777) were projected onto a two-dimensional (2D) space using the t-SNE algorithm (see FIG. 10). In the t-SNE plot, the cells stained with the different Rdots are well separated, indicating that the spectral resolvability was retained at a single-cell level. More quantitatively, the obtained 11,777 spectra were classified to one Rdot based on the maximum $C_i$ values. 11,544 out of 11,777 spectra were found to be assigned to the correct Rdots (accuracy=98.0%) (see FIG. 11).

Example 2

Figure 12:
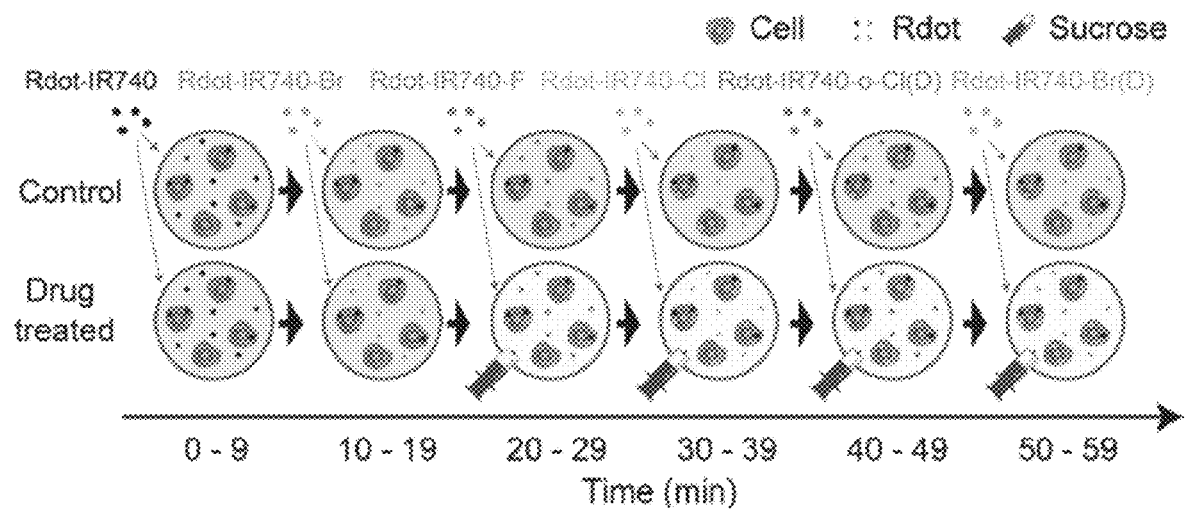
FIG. 12 provides an illustration of an experimental scheme.
Figure 13:
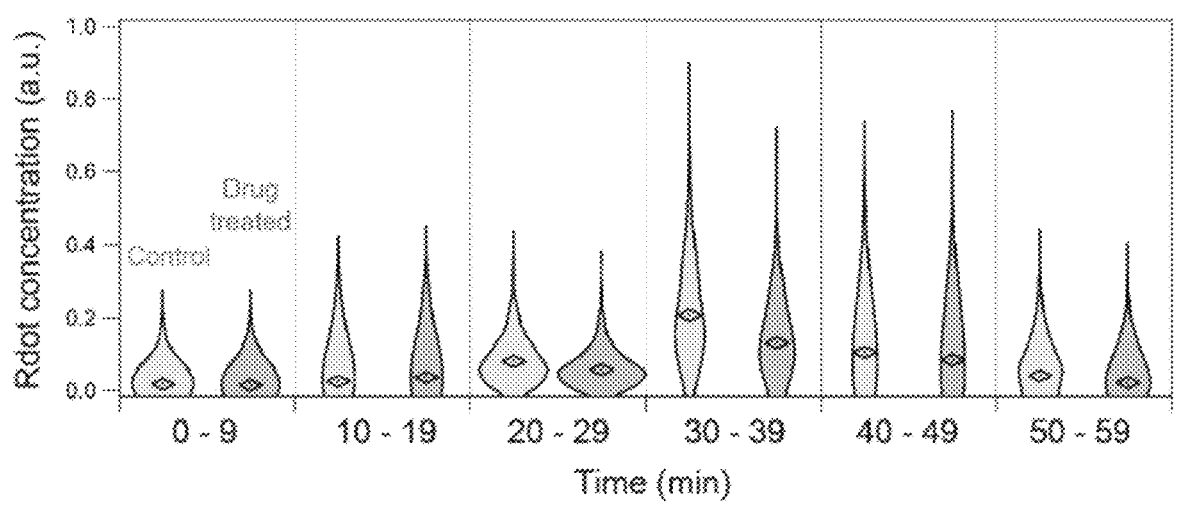
FIG. 13 provides a graph showing concentrations of Rdots incorporated in each time period within cells identified by the multiplex flow cytometer with Raman tags.

To show the capability of the present solution to study cellular activity on a large scale, the present solution was applied to a large-scale time-course analysis of cellular endocytosis via multiplex flow cytometry with Raman tags. Specifically, MCF-7 breast cancer cells were consecutively incubated in culture media containing 6 different Rdots (see FIG. 12). By using different Rdots in different periods of the incubation, the activity of endocytosis at different times was encoded in each cell's Rdot concentration, which was decoded by Raman spectral measurements. Between twenty and sixty minutes after the beginning of the incubation, an endocytosis inhibitor, sucrose, was added to the culture media to suppress the endocytosis activity (See FIG. 12). After the incubation, unincorporated Rdots were removed, and the cells were detached from the flask using trypsin/EDTA for multiplex flow cytometry measurements. In each condition (control, sucrose), two thousand cells were measured at throughputs of forty to fifty cells per second. The concentrations of Rdots in the cells were determined by the fitting analysis of the obtained single-cell Raman spectra. In the control group, where no inhibitor was added, the endocytosis activity was maximized from twenty to thirty-nine minutes and then decayed after forty minutes (See FIG. 13). This trend is consistent with the previously reported endocytosis dynamics.

For the groups treated with sucrose (0.5 M) from twenty to sixty minutes, suppressed endocytosis activity was observed immediately after the drug treatment (twenty to twenty-nine minutes). The suppression continued until the fifty-nineth minute, which is also consistent with a previous report on the efficacy of sucrose inhibition. The results show that the power of multiplex flow cytometry with Raman tags combined with the spectral encoding of cellular dynamics enabled large-scale analysis of endocytosis. In this proof-of-principle demonstration, six colors were used for observing endocytosis in six different time periods, but the present solution is extendable with a much larger number of colors, that is, time periods.

Figure 14:
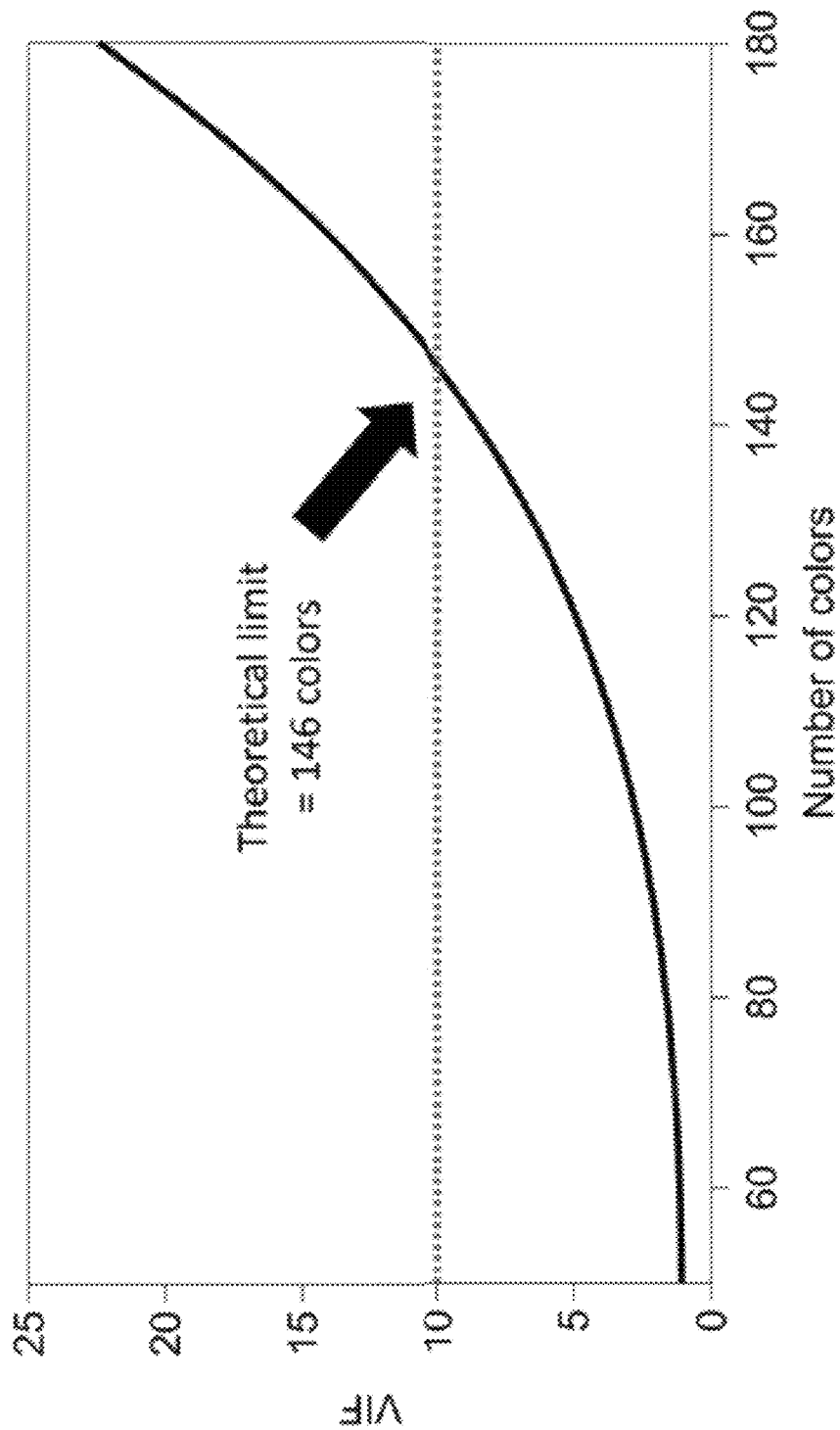
FIG. 14 provides a graph showing a theoretical estimation of a maximum number of colors that are feasible with a single excitation lase and a single detector.

The method presented here can be further improved in the following directions. First, the number of colors can be increased by synthesizing new cyanine dyes in the present scheme. While substituents were added to the edge of the IR740 skeleton for multiplexing in this study, >100 different tags can be synthesized by using different positions (>30 positions) and skeletons (>5 skeletons). Unlike the nitrile- and alkyne-based Raman tags synthesized for the silent region, it is highly probable that a randomly synthesized novel cyanine-based Raman tag has a low VIF value by virtue of the broadband nature of our FT-CARS flow cytometer. This easy-to-design property is central to the color scalability in our Raman-tag-based multiplex flow cytometry approach. In fact, with this extension, calculations indicate that it is theoretically feasible to achieve as many as one hundred forty colors with a single excitation laser (see FIG. 14).

Second, the detection sensitivity of Rdots can be enhanced by optimizing the staining procedure to import more dyes in one particle. However, increasing the number of dyes per bead does not always increase its Raman signal intensity in the present method. This is because the intermolecular interactions between the Raman tag molecules significantly change their electronic resonance. By appropriately designing spacer molecules as demonstrated in the development of ultra-bright fluorescence nanoparticles, it is possible to enclose more Raman tags in a unit volume.

Third, the present solution can be used for phenotyping cells by integrating with immunostaining. As Rdots can easily be functionalized by NETS-ester groups followed by bond formation to antibodies. Rdot-based immunostaining can readily be performed. Phenotyping of cells with the number of colors comparable to mass cytometry is feasible in a non-destructive manner with this approach.

Figure 15:
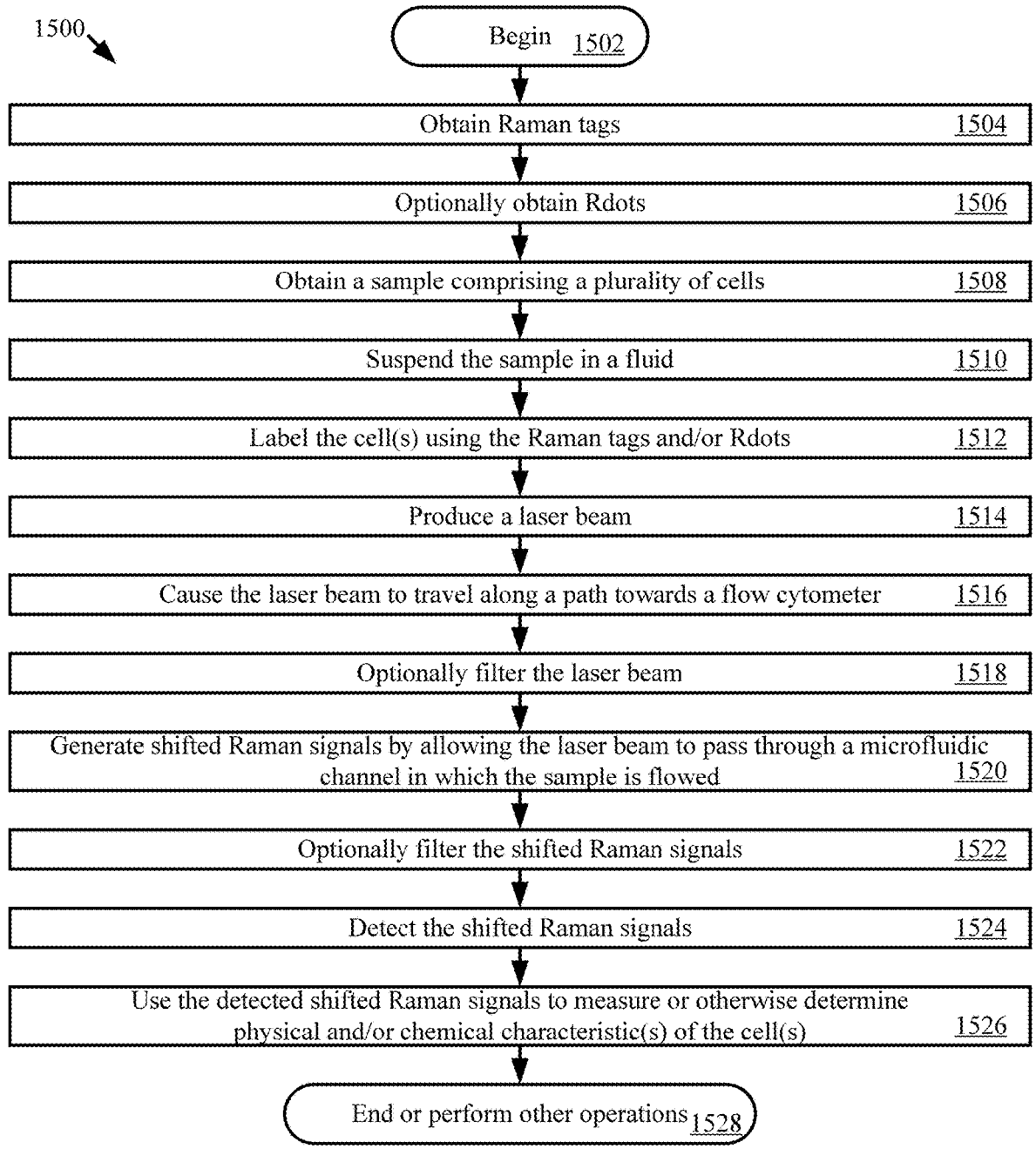
FIG. 15 provides a flow diagram of an illustrative method for color-scalable flow cytometry with Raman tags.

Referring now to FIG. 15, there is provided a flow diagram of an illustrative method 1500 for color-scalable flow cytometry with Raman tags. Method 1500 begins with 1502 and continues with 1504 where Raman tags are obtained by acquiring and/or synthesizing compounds.

Figure 16:
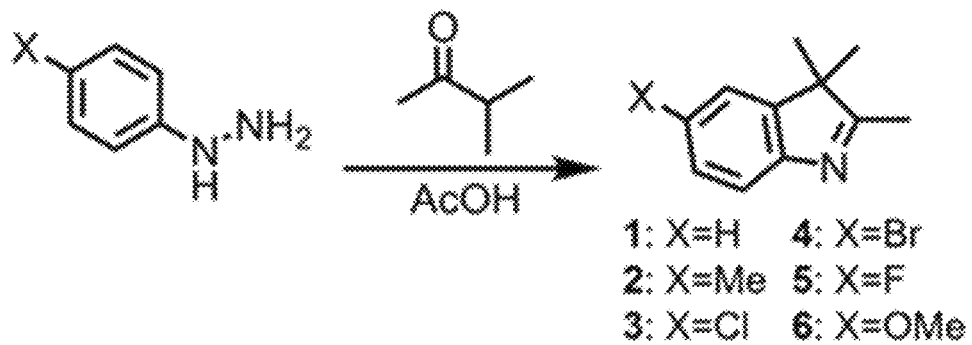
FIG. 16-25 provide illustrations that are useful for understanding various compounds.

In some scenarios, thirty compounds 1-30 are acquired and/or synthesized. Compound 1 may include a substituted indolenine. An illustration is provided in FIG. 16 that is useful for understanding compound 1.

Figure 17:
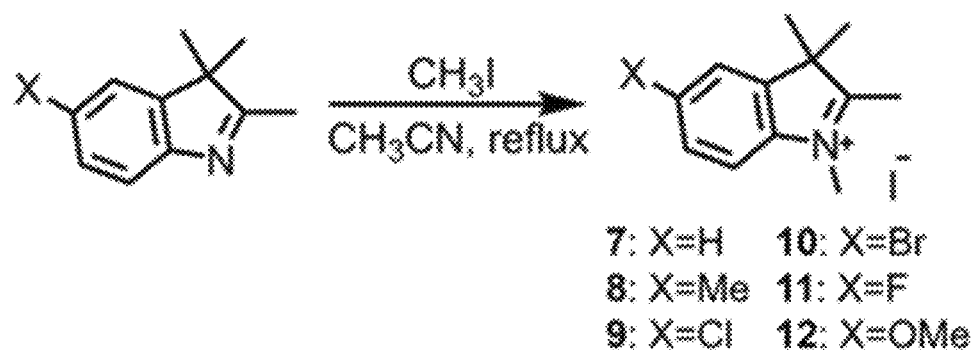

Compounds 2-6 may include 5-substituted 2,3,3-trimethylindolenine species, and be synthesized in accordance with the procedure described in an article entitled "Near-Infrared Illumination of Native Tissues for Image-Guided Surgery" which was written by E. A. Owens et al. 4-Substituted phenylhydrazine hydrochloride derivatives are dissolved in glacial acetic acid (25 mL) in a round-bottom flask and the mixture is stirred at 80° C. for 30 min. The 4-Substituted phenylhydrazine hydrochloride derivatives include: a p-Tolylhydrazine Hydrochloride available from Sigma-Aldrich®, Inc. of St. Louis Missouri; a T40606/4-Chlorophenylhydrazine Hydrochloride available from Sigma-Aldrich®, Inc. of St. Louis Missouri; a C65807/4-Bromophenylhydrazine Hydrochloride available from FUJIFILM Wako Pure Chemicals Corp. of Osaka Japan; a 326-26891/4-Fluorophenylhydrazine Hydrochloride, available from FUJIFILM Wako Pure Chemicals Corp. of Osaka Japan; and 358-21751/4-Methoxyphenylhydrazine Hydrochloride available from Sigma-Aldrich®, Inc. of St. Louis Missouri (152137, 3.0 g). Then, 3-methyl-2-butanone is added. The 3-methyl-2-butanone is available from FUJIFILM Wako Pure Chemicals Corp. of Osaka Japan (131-03783, 3 mol. equiv.). The mixture is refluxed for 15-20 h and cooled to room temperature. The resulting mixture is concentrated with a rotary evaporator to remove acetic acid. The concentrated oil is diluted with 25-mL dichloromethane (25 mL), washed with water three times, and dried over $MgSO_4$. The solvent is then removed with a rotary evaporator to obtain the indolenine product. The compounds 2-6 may be used for the next step without purification. An illustration is provided in FIG. 17 that is useful for understanding compounds 2-6 (5-substituted indolenine species).

Figure 18:
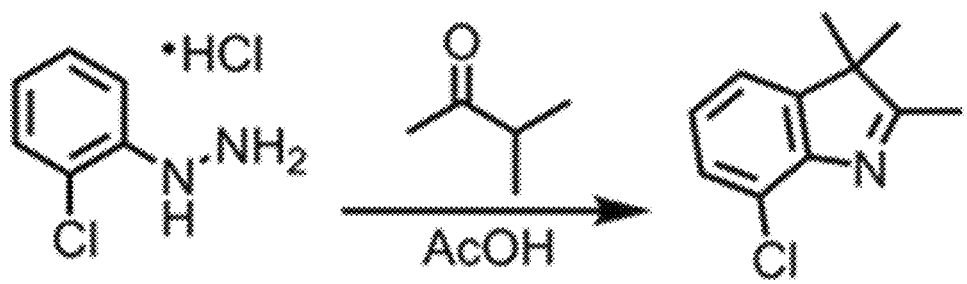
Figure 26:
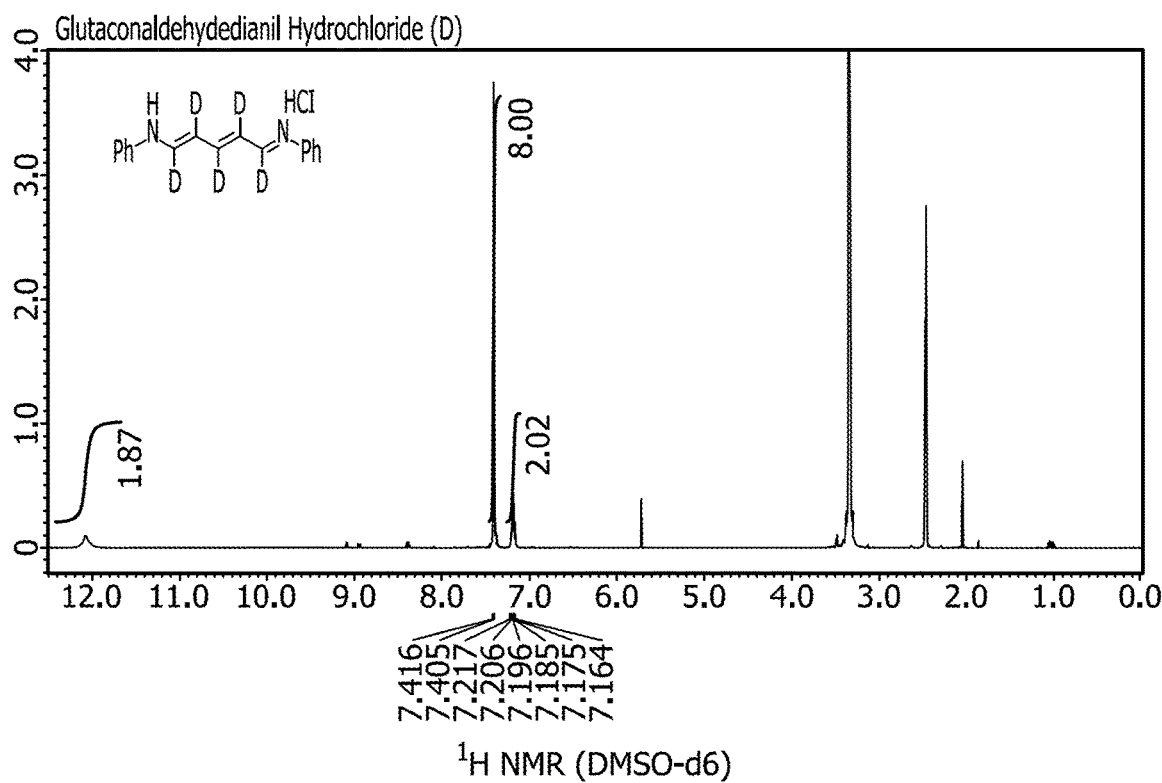
FIGS. 26-33 each provides graphs that show a Nuclear Magnetic Resonance (NMR) spectra for synthesized compounds.
Figure 26:
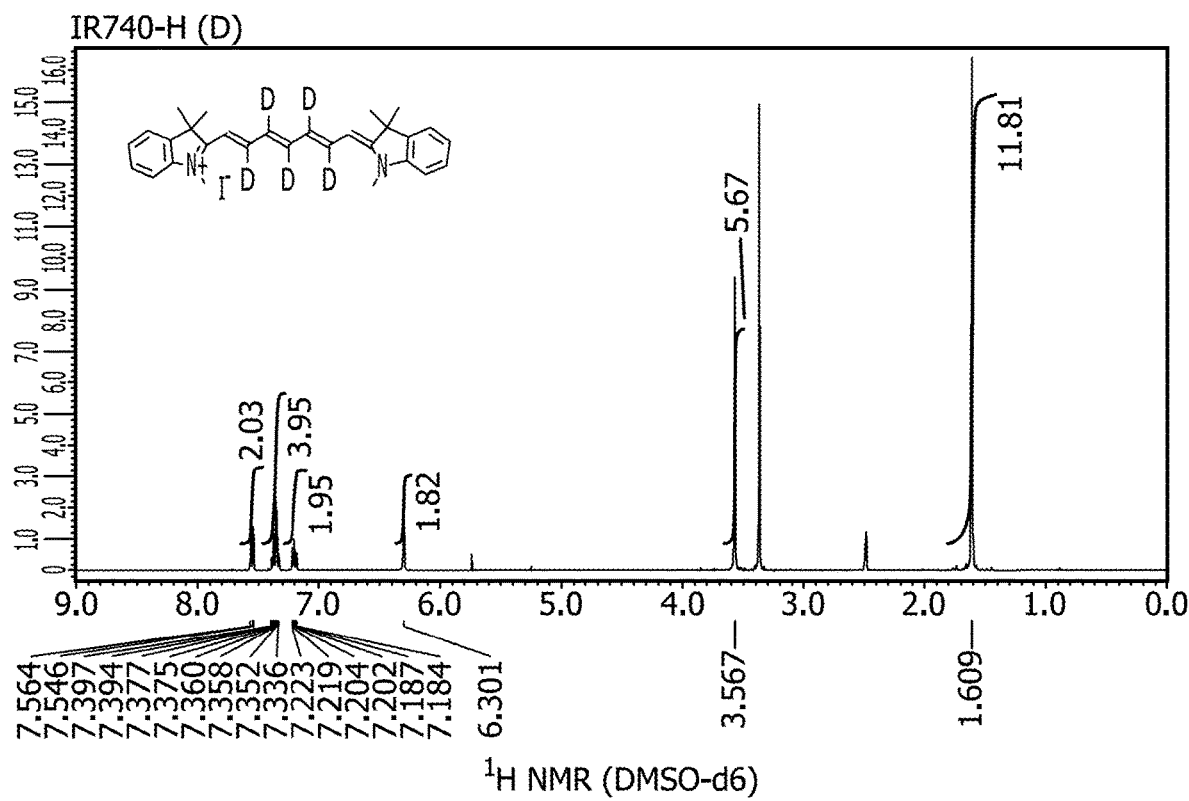
Figure 27:
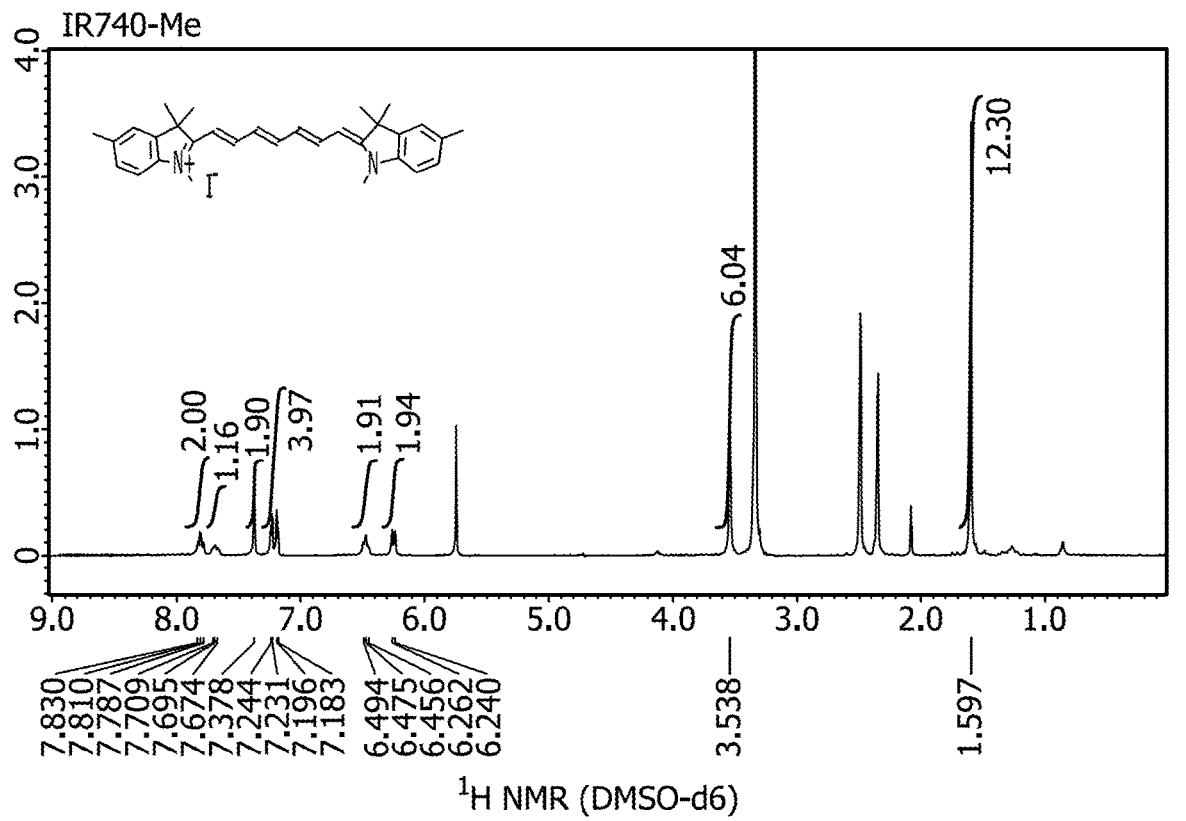
Figure 27:
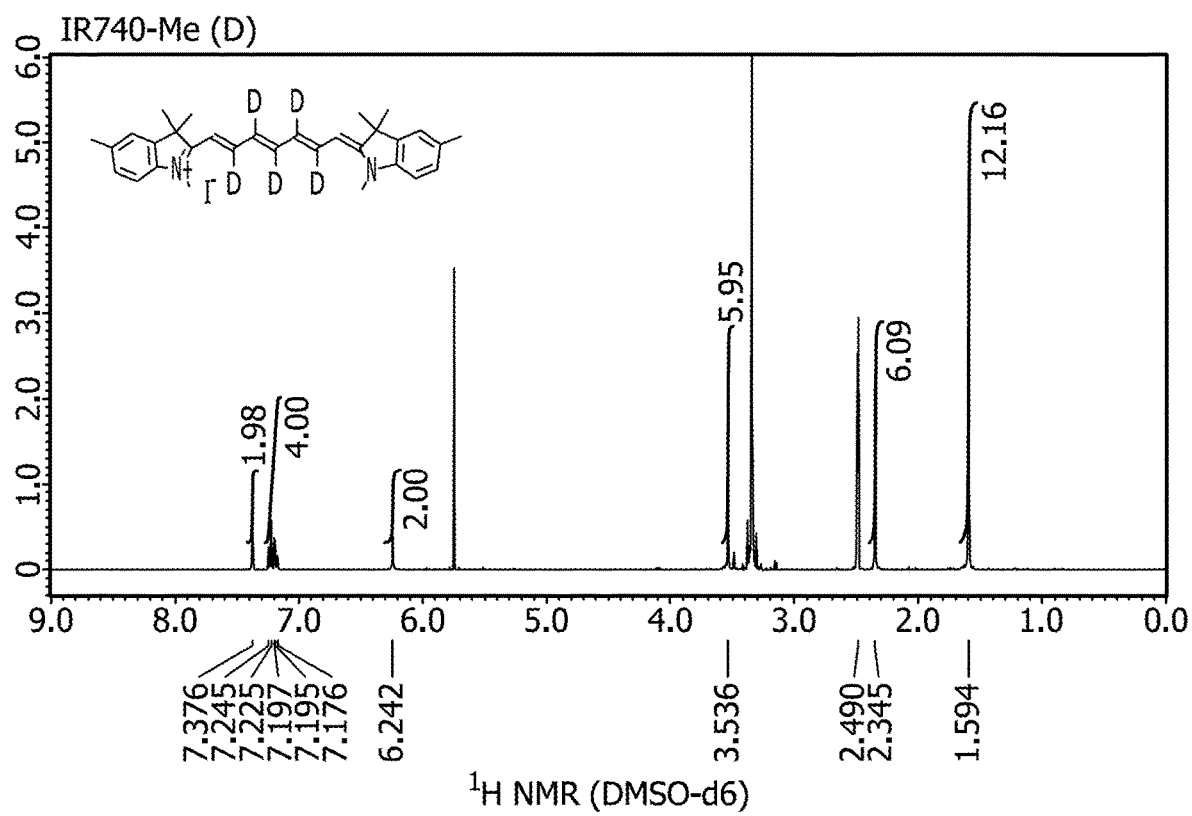
Figure 28:
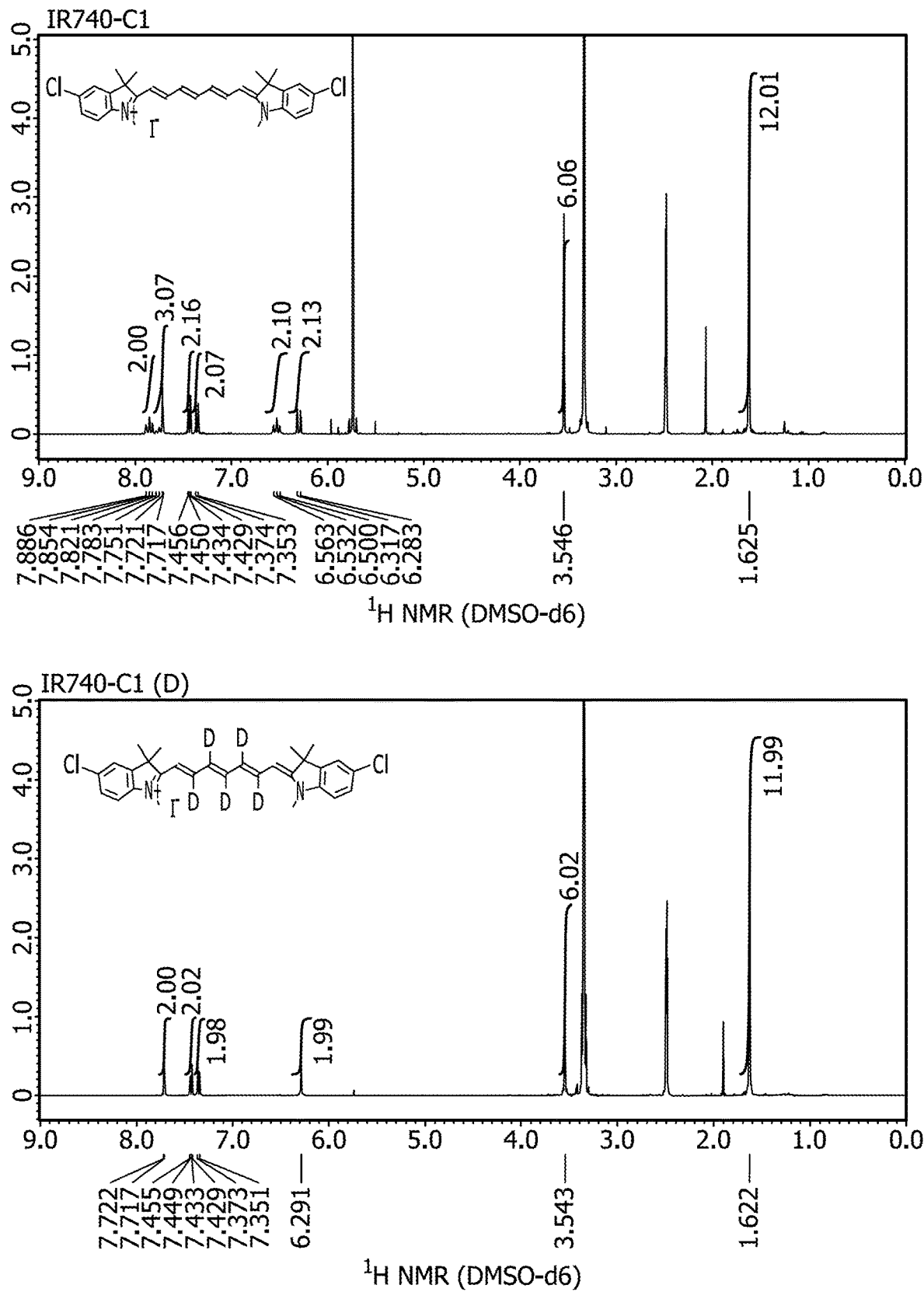
Figure 29:
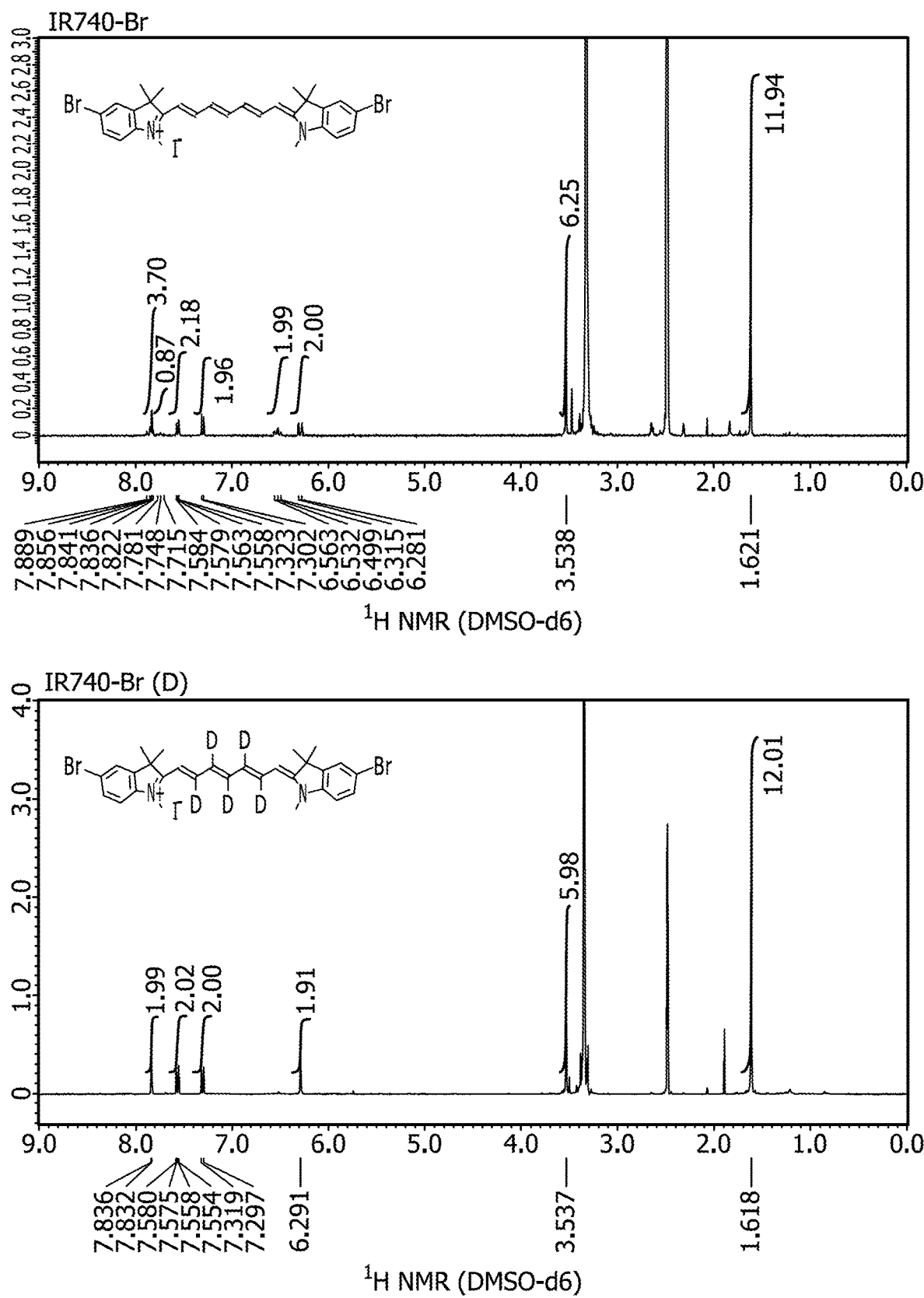

Compounds 8-12 may include 5-substituted 1,2,3,3-tetramethylindolium salts, and be synthesized in accordance with the procedure described in an article entitled "Near-Infrared Illumination of Native Tissues for Image-Guided Surgery" which was written by E. A. Owens et al. To a solution of 5-substituted 2,3,3-trimethylindolenine (2-6) in anhydrous acetonitrile (10 mL), iodomethane is added. The iodomethane is available from FUJIFILM Wako Pure Chemicals Corp. of Osaka Japan (142-04191, 3.0 eq.). The mixture is refluxed (100° C.) for 12-15 h. After cooling to room temperature, the acetonitrile is removed with a rotary evaporator. The crude product is dissolved in methanol, and then cold diethyl ether is added to precipitate the product. The solid is filtered out and dried to obtain compounds 8-12. Compound 7 is available from Tokyo Chemical Industry Co., Ltd. of Tokyo Japan (T0766). An illustration is provided in FIG. 18 that is useful for understanding compounds 7-12 (5-substituted indolenium salts). Graphs are provided in FIG. 26 that show the NMR spectra for synthesized compound 9. Graphs are provided in FIG. 27 that show the NMR spectra for synthesized compound 10. Graphs are provided in FIG. 28 that show the NMR spectra for synthesized compound 11. Graphs are provided in FIG. 29 that show the NMR spectra for synthesized compound 12.

Figure 19:
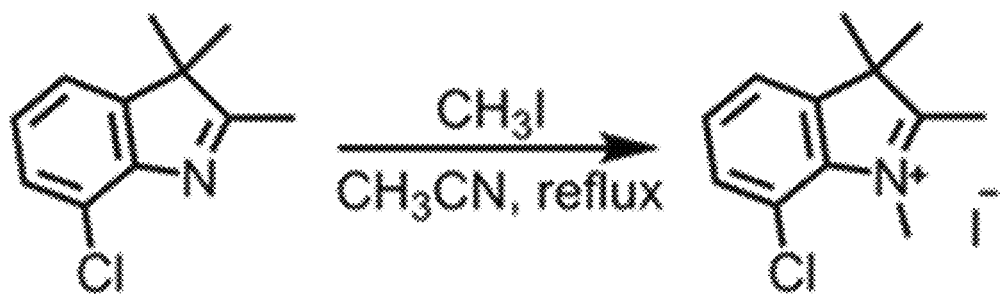
Figure 30:
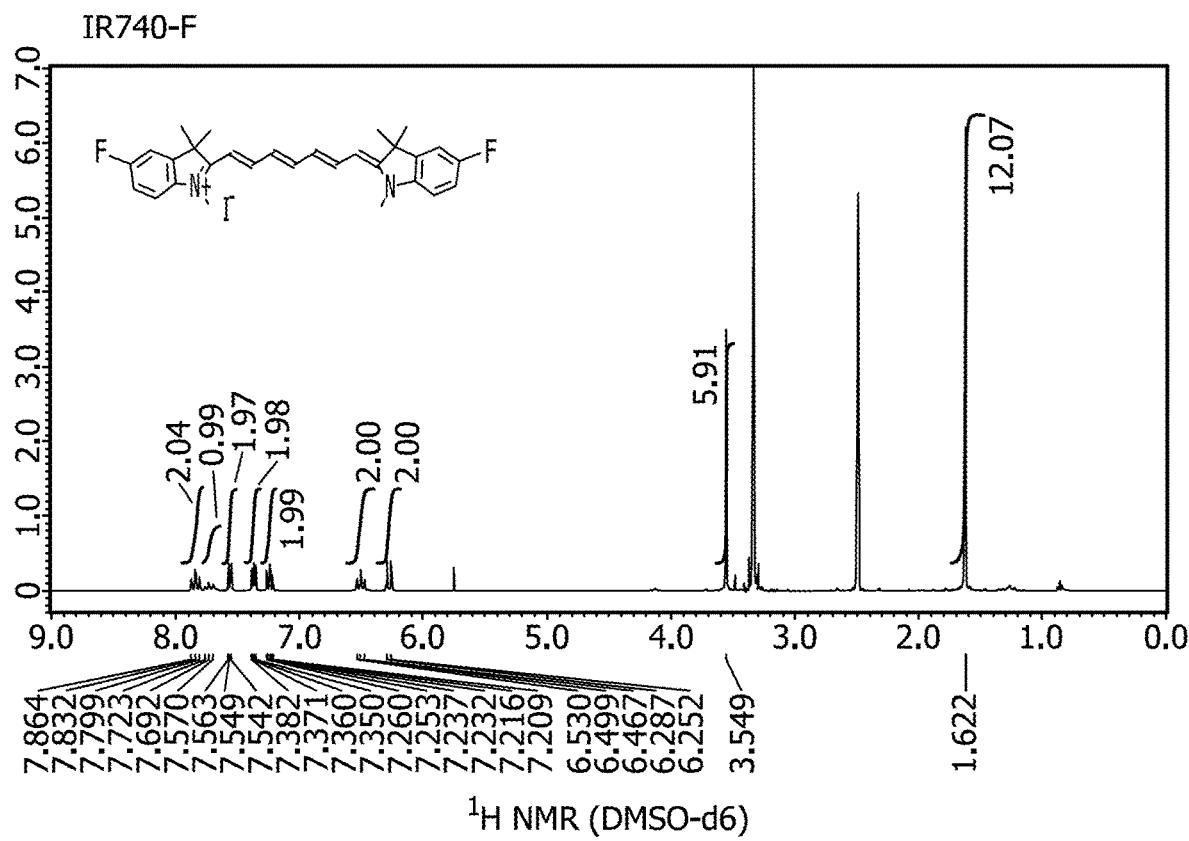
Figure 30:
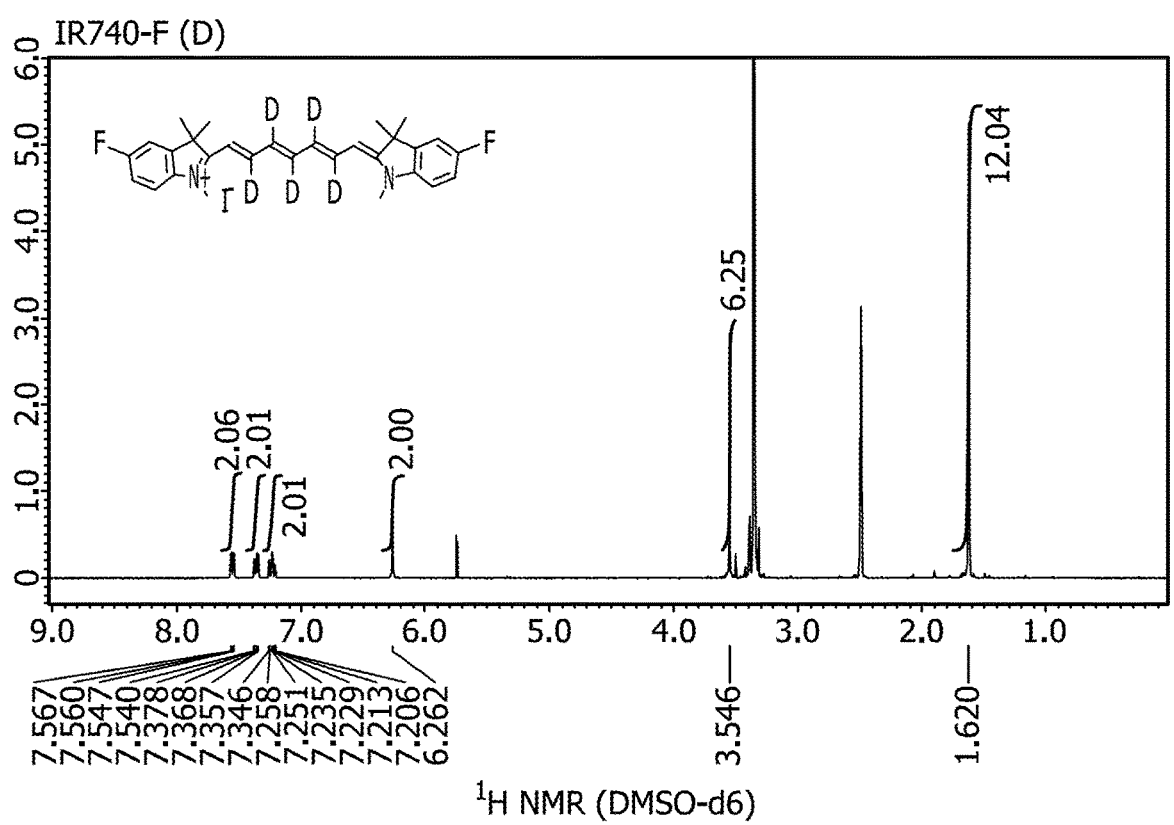

Compound 13 may include -chloro 2,3,3-trimethylindolenine, and be synthesized in accordance with the procedure described in an article entitled "Near-Infrared Illumination of Native Tissues for Image-Guided Surgery" which was written by E. A. Owens et al. 2-Chlorophenylhydrazine hydrochloride (3.0 g) are added to glacial acetic acid (25 mL) in a round-bottom flask and the mixture is stirred at 80° C. for 30 min. Then, 3-methyl-2-butanone (3.0 eq., 5.34 mL) is added to the solution. The mixture is refluxed for four hours and cooled to room temperature. The resulting mixture is concentrated with a rotary evaporator to remove acetic acid. The resulted oil is diluted with dichloromethane (25 mL), washed with water three times, and dried over $MgSO_4$. The solvent is then removed with a rotary evaporator to obtain 0.93 g of compound 13, which may be used for the next step without purification. An illustration is provided in FIG. 19 that is useful for understanding compound 13 (7-chloro indolenine). Graphs are provided in FIG. 30 that show the NMR spectra for synthesized compound 13.

Figure 20:
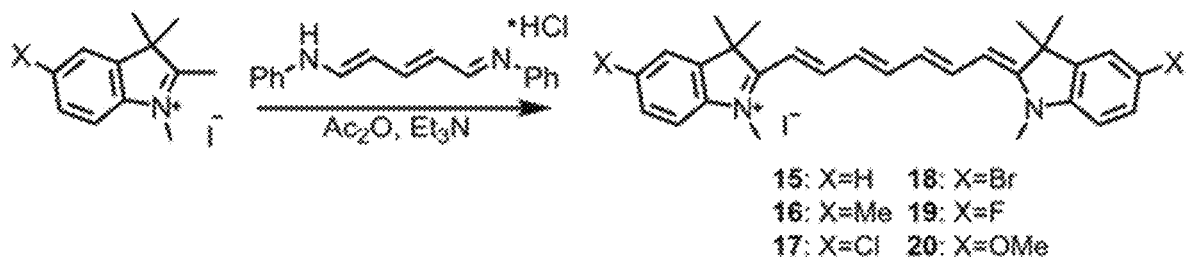
Figure 31:
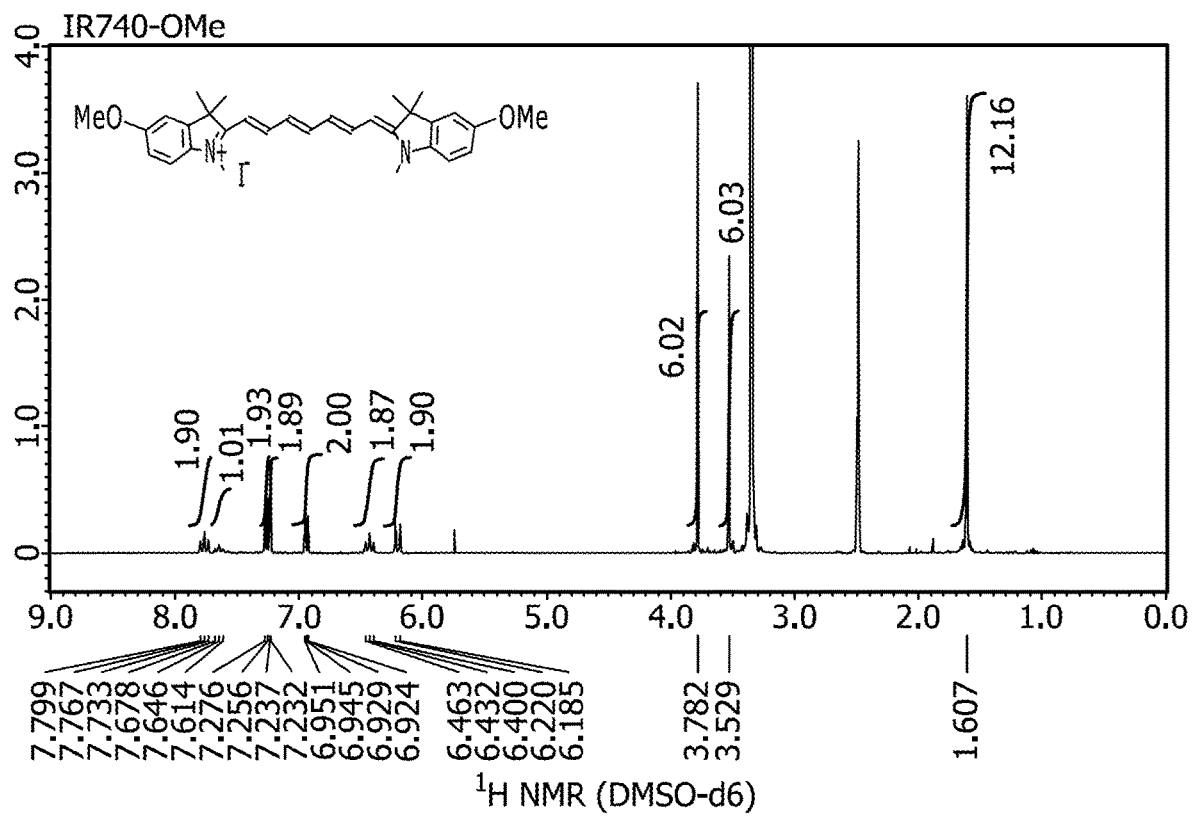
Figure 31:
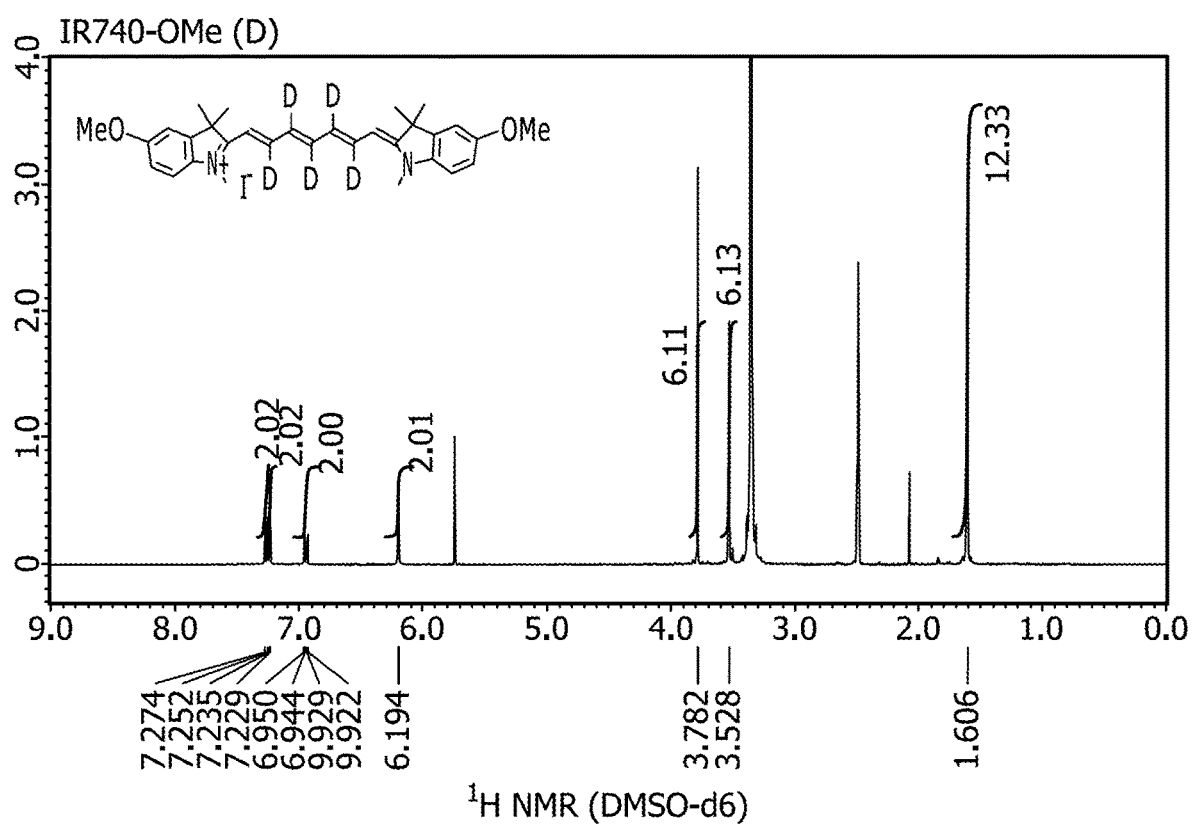

Compound 14 can include 7-chloro 1,2,3,3-tetramethylindolium salt, and may be synthesized in accordance with the procedure described in an article entitled "Near-Infrared Illumination of Native Tissues for Image-Guided Surgery" which was written by E. A. Owens et al. To a solution of compound 13 (0.93 g) in anhydrous acetonitrile (10 mL), iodomethane (3.0 eq., 1.0 mL) is added. The mixture is refluxed (100° C.) for 12 h. After cooling to room temperature, acetonitrile is removed with a rotary evaporator. The crude product is dissolved in methanol, and then cold diethyl ether is added to precipitate the product. The solid is filtered out and dried to obtain 0.35 g of compound 14 (Yield: 22%). An illustration is provided in FIG. 20 that is useful for understanding compound 14 (7-chloro indolenium salt). Graphs are provided in FIG. 31 that show the NMR spectra for synthesized compound 14.

Figure 32:
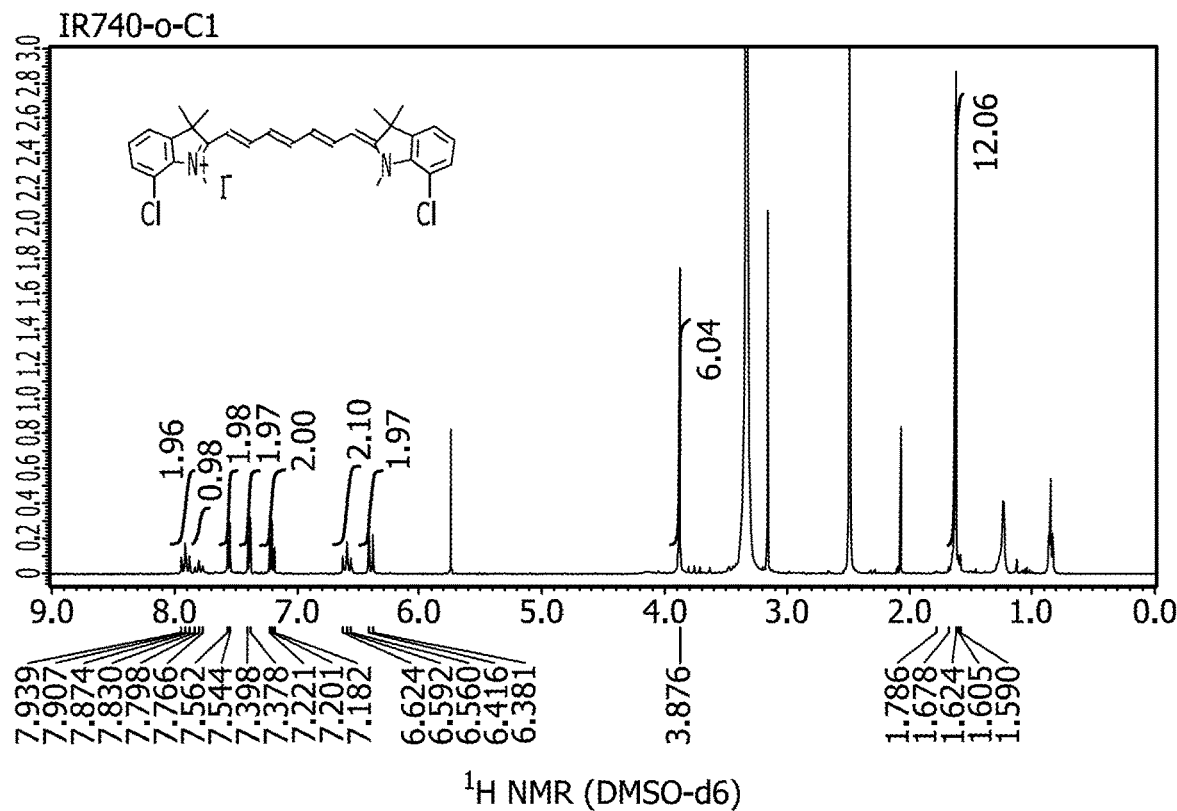
Figure 32:
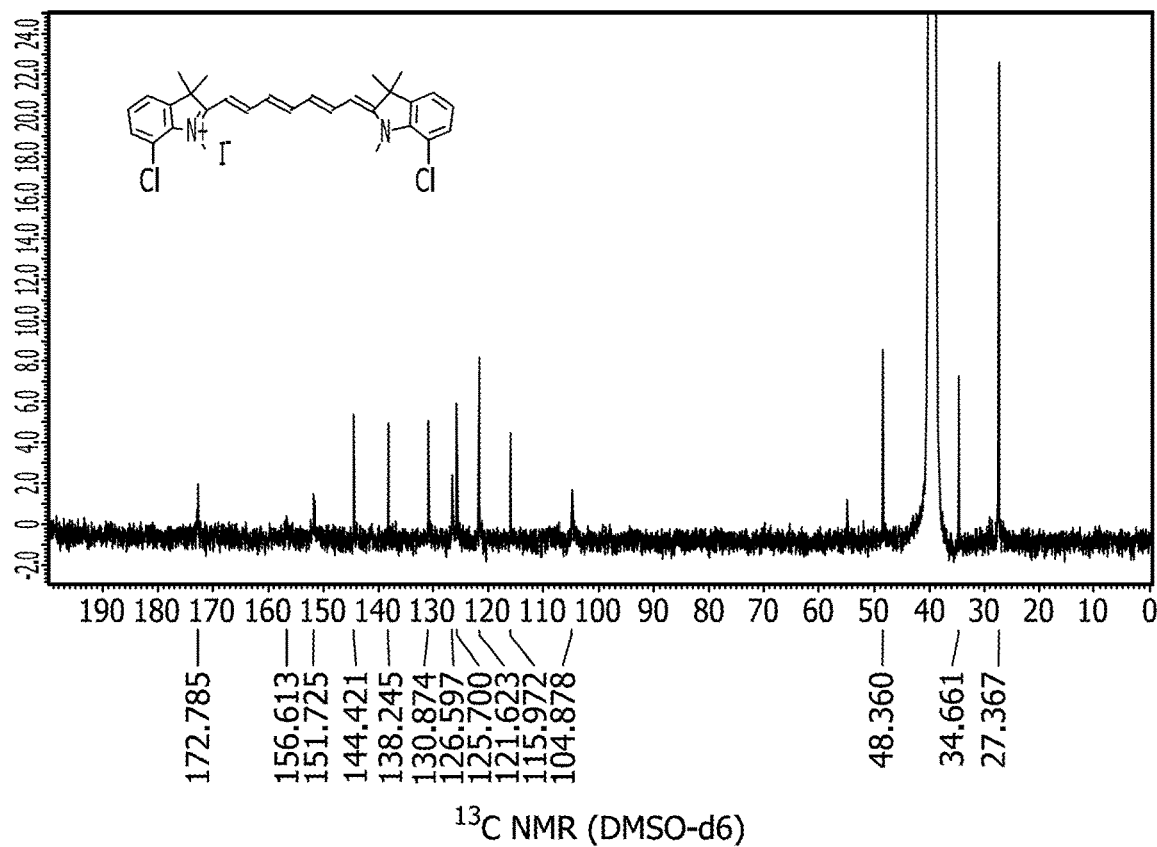

Compound 15 is available from Sigma-Aldrich®, Inc. of St. Louis Missouri (252034). Graphs are provided in FIG. 32 that show the NMR spectra for synthesized compound 15.

Figure 33:
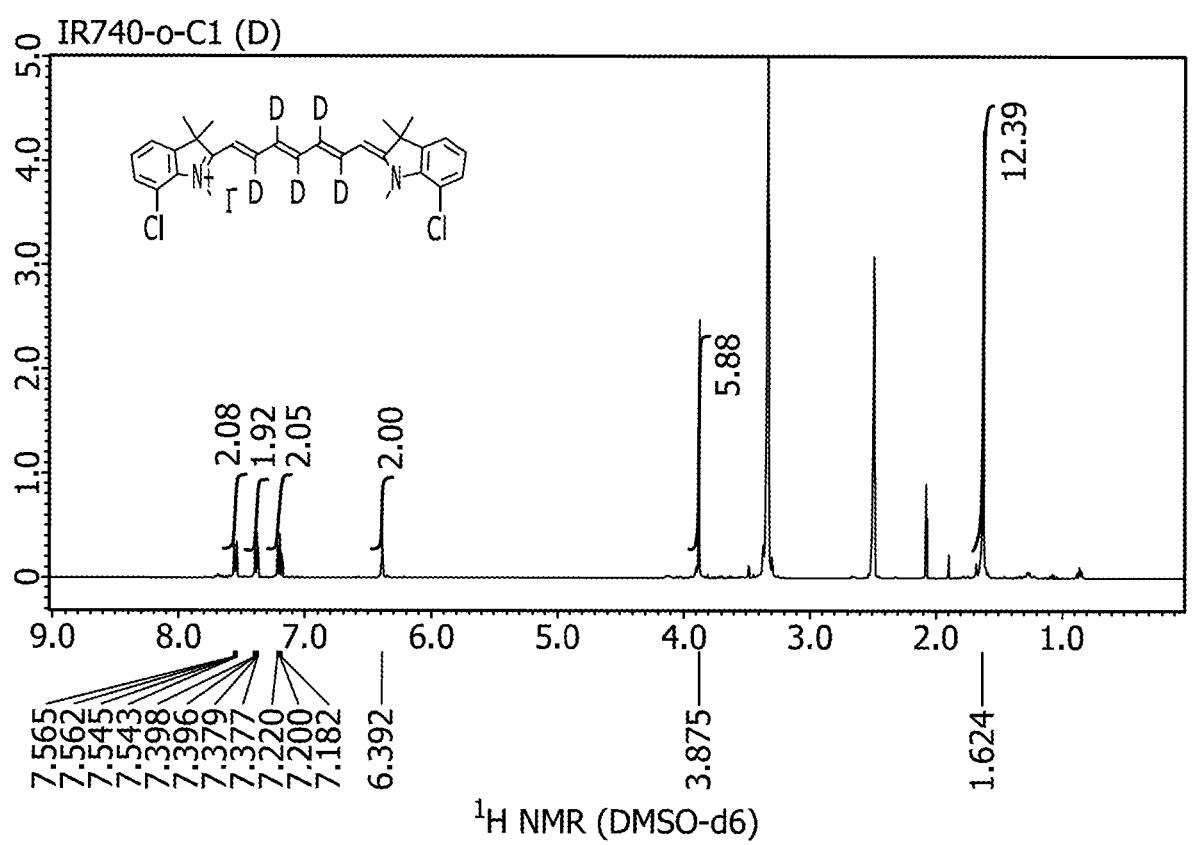

Compounds 16-20 may include 5-substituted symmetric cyanine dyes, and be synthesized in accordance with the procedure described in an article entitled "Structure-Inherent Targeting of Near-Infrared Flurophores for Parathyroid and Thyroid Gland Imaging" which was written by H. Hyun et al. In a test tube, 100 mg of the indolenium salt (8-12) and glutaconaldehydedianil hydrochloride were allowed to settle. The glutaconaldehydedianil hydrochloride is available from FUJIFILM Wako Pure Chemicals Corp. of Osaka Japan (053324, 0.5 eq.). Then, acetic anhydride (0.25 mL) and triethylamine (3.0 eq.) are added. The mixture is warmed to 60° C. and stirred for 2 h. After cooling to room temperature, dichloromethane and water (1:1 ratio) are added to the reaction mixture. Extraction with dichloromethane is repeated three times. After washing the solution with water, dichloromethane is removed with a rotary evaporator. Flash column chromatography of the crude product on silica gel (5-10% methanol in dichloromethane) afforded the compounds 16-20 (5-substituted symmetric cyanine dyes). An illustration is provided in FIG. 20 that is useful for understanding compounds 15-20 (symmetric cyanine dyes). A graph is provided in FIG. 33 that show the NMR spectra for synthesized compound 16.

Figure 21:
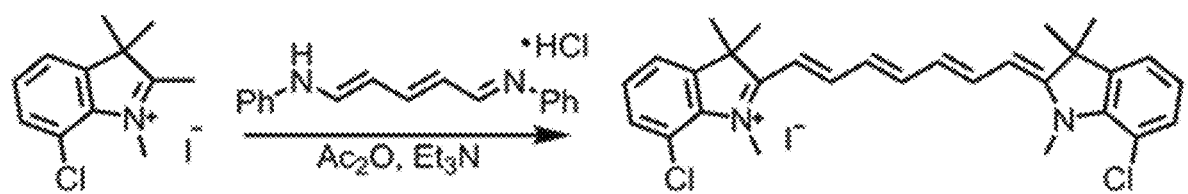

Compound 21 may include 7-chloro symmetric cyanine dye, and be synthesized in accordance with the procedure described in an article entitled "Structure-Inherent Targeting of Near-Infrared Flurophores for Parathyroid and Thyroid Gland Imaging" which was written by H. Hyub et al. In a test tube, 100 mg of the indolenium salt compound 14 and 42 mg of glutaconaldehydedianil hydrochloride (0.5 eq.) are allowed to settle. Then, acetic anhydride (0.25 mL) and triethylamine (3.0 eq., 62.3 µL) are added. The mixture is warmed to 60° C. and stirred for 2 h. After cooling to room temperature, dichloromethane and water (1:1 ratio) are added to the reaction mixture. Extraction with dichloromethane is repeated three times. After washing the solution with water, dichloromethane is removed with a rotary evaporator. Flash column chromatography of the crude product on silica gel (5-10% methanol in dichloromethane) afforded 58 mg (Yield: 62%) of pure product 21. An illustration is provided in FIG. 21 that is useful for understanding compound 21 (7-chloro symmetric cyanine dye).

Figure 22:
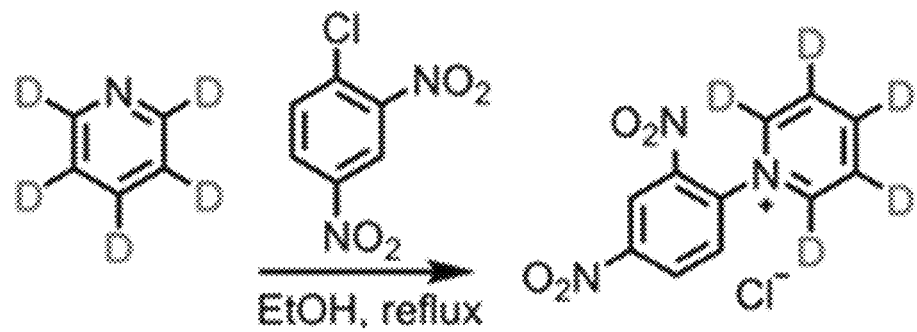

Compound 22 may include deuterated Zincke salt and be synthesized according to a procedure described in an article entitled "Radical Reactions Induced by Visible Light in Dichloromethane Solutions of Hünig's Base: Synthetic Applications and Mechanistic Observations" which was written by A. Bohm et al. Two grams of 1-Chloro-2,4-dinitrobenzene is dissolved in acetone (10 mL) with stirring in a flask. The 1-Chloro-2,4-dinitrobenzene is available from Tokyo Chemical Industry Co., Ltd. of Tokyo Japan (C0162). Pyridine-d5, 99.5% (810 µL) is added to the solution, and the mixture is refluxed (75° C.) for 19 h and cooled to room temperature. The Pyridine-d5 is available from FUJIFILM Wako Pure Chemicals Corp. of Osaka Japan (163-28381). The reaction mixture is then filtered to obtain a white solid. The solid is washed with pentane and 2.2 g of compound 22 is obtained (Yield: 38%). An illustration is provided in FIG. 22 that is useful for understanding compound 22 (deuterated Zincke salt).

Figure 23:
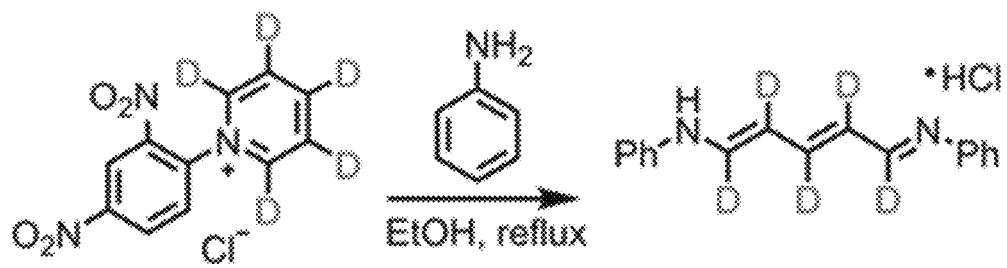

Compound 23 may include 1,2,3,4,5-deuterated glutaconaldehydedianil hydrochloride and be synthesized based according to a procedure described in an article entitled "Formation of Phenylpyridinium Chloride from 5-anilino-N-phenyl-2,4-pentadienylideniminium chloride in acidic media" which was written by E. N. Marvell et al. Compound 22 (2.0 g) is dissolved in 80% aqueous ethanol (18 mL). A solution of aniline (1.4 mL) in 80% aqueous ethanol (18 ml) is slowly added to the mixture. After stirring for 70 min, the reaction mixture is filtered to obtain a solid. The solid is dissolved in methanol and diethyl ether is added to precipitate the product. The solid is washed with diethyl ether and dried to afford 0.58 g of compound 23 (Yield: 29%). An illustration is provided in FIG. 23 that is useful for understanding compound 22 (deuterated glutaconaldehydedianil hydrochloride).

Figure 24:
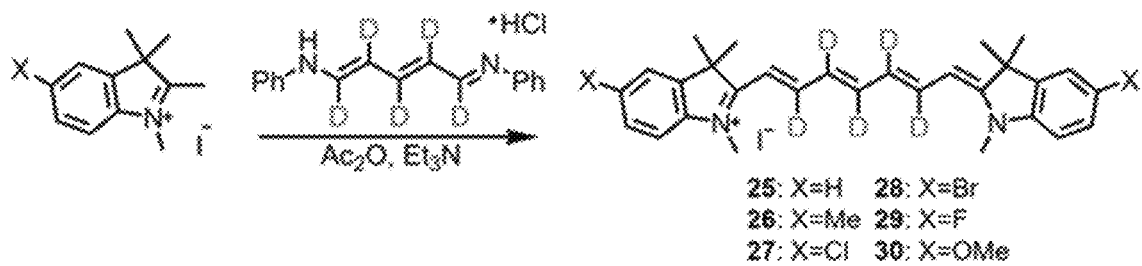

Compounds 24-29 may include deuterated 5-substituted symmetric cyanine dyes and be synthesized according to the procedure described in an article entitled "Structure-Inherent Targeting of Near-Infrared Flurophores for Parathyroid and Thyroid Gland Imaging" which was written by H. Hyun et al. In a test tube, 100 mg of the indolenium salt compound 8-12 and compound 23 are allowed to settle. Then, acetic anhydride (0.25 mL) and triethylamine (3.0 eq.) are added. The mixture is warmed to 60° C. and stirred for two hours. After cooling to room temperature, dichloromethane and water (1:1 ratio) are added to the reaction mixture. Extraction with dichloromethane is repeated three times. After washing the solution with water, dichloromethane is removed with a rotary evaporator. Flash column chromatography of the crude product on silica gel (5-10% methanol in dichloromethane) afforded the pure target products 24-29. An illustration is provided in FIG. 24 that is useful for understanding compounds 24-29 (deuterated 5-substituted symmetric cyanine dyes).

Figure 25:
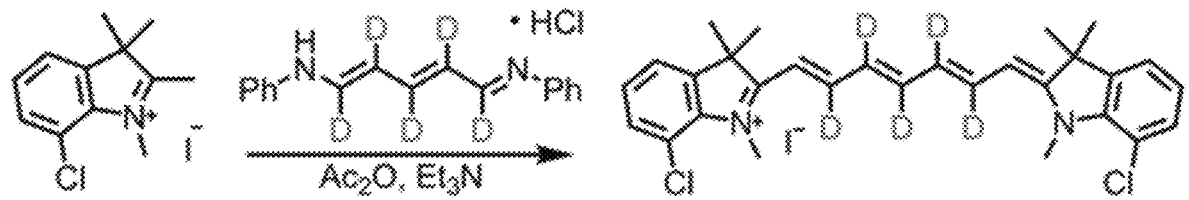

Compound 30 may include deuterated 7-chloro symmetric cyanine dye and be synthesized according to the procedure described in an article entitled "Structure-Inherent Targeting of Near-Infrared Flurophores for Parathyroid and Thyroid Gland Imaging" which was written by H. Hyun et al. In a test tube, 100 mg of the indolenium salt compound 14 and compound 23 are allowed to settle. Then, acetic anhydride (0.25 mL) and triethylamine (3 eq., 62.5 µL) are added. The mixture is warmed to 60° C. and stirred for two hours. After cooling to room temperature, dichloromethane and water (1:1 ratio) are added to the reaction mixture. Extraction with dichloromethane is repeated three times. After washing the solution with water, dichloromethane is removed with a rotary evaporator. Flash column chromatography of the crude product on silica gel (5-10% methanol in dichloromethane) afforded 60 mg (Yield: 66%) of pure product 30. An illustration is provided in FIG. 25 that is useful for understanding compound 30 (deuterated 7-chloro symmetric cyanine dye).

Characterization 2-(7-(1,3,3,5-tetramethylindolin-2-ylidene)-1,3,5-heptatrienyl)-1,3,3,5-tetramethylindolium iodide (IR740-Me, 16)

Yield 89%; $^1$H-NMR (600 MHz, DMSO-D6) δ 7.81 (t, J=13.4 Hz, 2H), 7.69 (m, 1H), 7.38 (s, 2H), 7.24 (d, J=7.8 Hz, 2H), 7.19 (d, J=7.8 Hz, 2H), 6.48 (m, 2H), 6.25 (d, J=13.4 Hz, 2H), 3.54 (s, 6H), 2.35 (s, 6H), 1.60 (s, 12H); MS (ESI$^+$), m/z (relative intensity, %): 439.2 (M$^+$, 7), 438.2 (52), 437.2 (100).

2-(7-(5-chloro-1,3,3-trimethylindolin-2-ylidene)-1,3,5-heptatrienyl)-5-chloro-1,3,3-trimethylindolium iodide (IR740-Cl, 17)

Yield 82%; $^1$H-NMR (600 MHz, DMSO-D6) δ 7.85 (m, 2H), 7.77-7.72 (m, 3H), 7.44 (d, J=8.5 Hz, 2H), 7.36 (d, J=8.5 Hz, 2H), 6.53 (m, 2H), 6.30 (d, J=13.4 Hz, 2H), 3.55 (s, 6H), 1.62 (s, 12H); MS (ESI$^+$), m/z (relative intensity, %): 482.1 (M$^+$, 4), 481.1 (13), 480.1 (19), 479.1 (68), 478.1 (34), 477.1 (100).

2-(7-(5-bromo-1,3,3-trimethylindolin-2-ylidene)-1,3,5-heptatrienyl)-5-bromo-1,3,3-trimethylindolium iodide (IR740-Br, 18)

Yield 35%; $^1$H-NMR (401 MHz, DMSO-D6) δ 7.89-7.82 (m, 4H), 7.75 (m, 1H), 7.57 (dd, J=8.5, 2.1 Hz, 2H), 7.31 (d, J=8.5 Hz, 2H), 6.53 (m, 2H), 6.30 (d, J=13.8 Hz, 2H), 3.54 (s, 6H), 1.62 (s, 12H); MS (ESI$^+$), m/z (relative intensity, %): 571.0 (M$^+$, 2), 570.0 (16), 569.0 (55), 568.0 (33), 567.0 (100), 566.0 (17), 565.0 (54)

2-(7-(5-fluoro-1,3,3-trimethylindolin-2-ylidene)-1,3,5-heptatrienyl)-5-fluoro-1,3,3-trimethylindolium iodide (IR740-F, 19)

Yield 33%; $^1$H-NMR (401 MHz, DMSO-D6) δ 7.83 (m, 2H), 7.72 (m, 1H), 7.56 (dd, J=8.3, 2.8 Hz, 2H), 7.37 (dd, J=8.7, 4.1 Hz, 2H), 7.23 (td, J=8.7, 2.8 Hz, 2H), 6.50 (m, 2H), 6.27 (d, J=13.7 Hz, 2H), 3.55 (s, 6H), 1.62 (s, 12H); MS (ESI$^+$), m/z (relative intensity, %): 447.2 (M$^+$, 8), 446.2 (49), 445.2 (100).

2-(7-(5-methoxy-1,3,3-trimethylindolin-2-ylidene)-1,3,5-heptatrienyl)-5-methoxy-1,3,3-trimethylindolium iodide (IR740-OMe, 20)

Yield 32%; $^1$H-NMR (401 MHz, DMSO-D6) δ 7.77 (m, 2H), 7.65 (m, 1H), 7.27 (d, J=8.7 Hz, 2H), 7.23 (d, J=2.3 Hz, 2H), 6.94 (dd, J=8.7, 2.3 Hz, 2H), 6.43 (m, 2H), 6.20 (d, J=13.7 Hz, 2H), 3.78 (s, 6H), 3.53 (s, 6H), 1.61 (s, 12H); MS (ESI$^+$), m/z (relative intensity, %): 471.2 (M$^+$, 7), 470.2 (38), 469.2 (100).

2-(7-(7-chloro-1,3,3-trimethylindolin-2-ylidene)-1,3,5-heptatrienyl)-7-chloro-1,3,3-trimethylindolium iodide (IR740-o-Cl, 21)

Yield 62%; $^1$H-NMR (400 MHz, DMSO-D6) δ 7.91 (m, 2H), 7.80 (m, 1H), 7.55 (d, J=7.3 Hz, 2H), 7.39 (d, J=7.8 Hz, 2H), 7.20 (dd, J=7.8, 7.3 Hz, 2H), 6.59 (m, 2H), 6.40 (d, J=13.7 Hz, 2H), 3.88 (s, 6H), 1.62 (s, 12H); $^{13}$C NMR (101 MHz, DMSO-d6): δ 27.37, 34.66, 48.36, 104.88, 115.97, 121.62, 125.70, 126.60, 130.87, 138.25, 144.42, 151.73, 156.61, 172.76; MS (ESI$^+$), m/z (relative intensity, %): 482.1 (M$^+$, 3), 481.1 (13), 480.1 (21), 479.1 (68), 478.1 (32), 477.1 (100).

N-(1,2,3,4,5-pentadeuterio-5-(phenylimino)penta-1,3-dienyl)aniline (23) Yield 11%; $^1$H-NMR (401 MHz, DMSO-D6) δ 12.07 (s, 2H), 7.41 (m, 8H), 7.19 (m, 2H); MS (ESI$^+$), m/z (relative intensity, %): 250.1 (M$^+$, 3), 251.1 (30), 252.1 (6), 253.1 (46), 254.1 (100), 255.1 (18), 256.1 (2).

2-(2,3,4,5,6-pentadeuterio-7-(1,3,3-trimethylindolin-2-ylidene)-1,3,5-heptatrienyl)-1,3,3-trimethylindolium iodide (IR740 (D), 24)

Yield 64%, $^1$H-NMR (401 MHz, DMSO-D6) δ 7.53 (d, J=7.4 Hz, 2H), 7.37-7.31 (m, 4H), 7.17 (td, J=7.4, 1.2 Hz, 2H), 6.27 (s, 2H), 3.54 (s, 6H), 1.58 (s, 12H); MS (ESI$^+$), m/z (relative intensity, %): 416.3 (M$^+$, 5), 415.3 (31), 414.3 (100), 413.3 (4).

2-(2,3,4,5,6-pentadeuterio-7-(1,3,3,5-tetramethylindolin-2-ylidene)-1,3,5-heptatrienyl)-1,3,3,5-tetramethylindolium iodide (IR740-Me (D), 25)

Yield 68%, $^1$H-NMR (401 MHz, DMSO-D6) δ 7.38 (s, 2H), 7.25-7.18 (m, 4H), 6.24 (s, 2H), 3.54 (s, 6H), 2.34 (s, 6H), 1.59 (s, 12H); MS (ESI$^+$), m/z (relative intensity, %): 444.2 (M$^+$, 10), 443.2 (57), 442.2 (100), 441.2 (9).

2-(2,3,4,5,6-pentadeuterio-7-(5-chloro-1,3,3-trimethylindolin-2-ylidene)-1,3,5-heptatrienyl)-5-chloro-1,3,3-trimethylindolium iodide (IR740-Cl (D), 26)

Yield 71%, $^1$H-NMR (401 MHz, DMSO-D6) δ 7.72 (d, J=2.1 Hz, 2H), 7.44 (dd, J=8.4, 2.1 Hz, 2H), 7.36 (d, J=8.4 Hz, 2H), 6.29 (s, 2H), 3.54 (s, 6H), 1.62 (s, 12H); MS (ESI$^+$), m/z (relative intensity, %): 487.1 (M$^+$, 4), 486.1 (14), 485.1 (23), 484.1 (75), 483.1 (39), 482.1 (100), 481.1 (5), 480.1 (2), 479.1 (5), 478.1 (2), 477.1 (7).

2-(2,3,4,5,6-pentadeuterio-7-(5-bromo-1,3,3-trimethylindolin-2-ylidene)-1,3,5-heptatrienyl)-5-bromo-1,3,3-trimethylindolium iodide (IR740-Br (D), 27)

Yield 68%, $^1$H-NMR (401 MHz, DMSO-D6) δ 7.83 (d, J=1.8 Hz, 2H), 7.57 (dd, J=8.7, 1.8 Hz, 2H), 7.31 (d, J=8.7 Hz, 2H), 6.29 (s, 2H), 3.54 (s, 6H), 1.62 (s, 12H); MS (ESI$^+$), m/z (relative intensity, %): 576.0 (M$^+$, 3), 575.0 (16), 574.0 (52), 573.0 (42), 572.0 (100), 571.0 (35), 570.0 (51), 569.0 (9).

2-(2,3,4,5,6-pentadeuterio-7-(5-fluoro-1,3,3-trimethylindolin-2-ylidene)-1,3,5-heptatrienyl)-5-fluoro-1,3,3-trimethylindolium iodide (IR740-F (D), 28)

Yield 40%, $^1$H-NMR (401 MHz, DMSO-D6) δ 7.55 (dd, J=8.3, 2.6 Hz, 2H), 7.36 (dd, J=8.7, 4.1 Hz, 2H), 7.23 (td, J=8.7, 2.8 Hz, 2H), 6.26 (s, 2H), 3.55 (s, 6H), 1.62 (s, 12H); MS (ESI$^+$), m/z (relative intensity, %): 452.2 (M$^+$, 7), 451.2 (47), 450.2 (100), 449.2 (2).

2-(2,3,4,5,6-pentadeuterio-7-(5-methoxy-1,3,3-trimethylindolin-2-ylidene)-1,3,5-heptatrienyl)-5-methoxy-1,3,3-trimethylindolium iodide (IR740-OMe(D), 29)

Yield 67%, $^1$H-NMR (401 MHz, DMSO-D6) δ 7.26 (d, J=8.7 Hz, 2H), 7.23 (d, J=2.5 Hz, 2H), 6.94 (dd, J=8.7, 2.5 Hz, 2H), 6.19 (s, 2H), 3.78 (s, 6H), 3.53 (s, 6H), 1.61 (s, 12H); MS (ESI$^+$), m/z (relative intensity, %): 476.2 (M+, 7), 475.2 (37), 474.2 (100), 473.2 (3).

2-(2,3,4,5,6-pentadeuterio-7-(7-chloro-1,3,3-trimethylindolin-2-ylidene)-1,3,5-heptatrienyl)-7-chloro-1,3,3-trimethylindolium iodide (IR740o-Cl (D), 30)

Yield 66%, $^1$H-NMR (400 MHz, DMSO-D6) δ 7.55 (dd, J=7.8, 0.9 Hz, 2H), 7.39 (dd, J=7.8, 0.9 Hz, 2H), 7.20 (t, J=7.8 Hz, 2H), 6.39 (s, 2H), 3.87 (s, 6H), 1.62 (s, 12H); MS (ESI$^+$), m/z (relative intensity, %): 487.1 (M$^+$, 3), 486.1 (13), 485.1 (22), 484.1 (68), 484.1 (68), 483.1 (35), 482.1 (100), 481.1 (3).

Referring back to FIG. 15, method 1500 continues with 1506 where Rdots are optionally obtained. Each Rdot comprises a nanoparticle containing densely packed Raman tags. The nanoparticle can include, but are not limited to, polymer nanoparticles.

In 1508, a sample (e.g., sample 114 of FIG. 1) is obtained that comprises a plurality of cells. The sample is then suspended in a fluid within a reservoir (e.g., reservoir 128 of FIG. 1). The cell(s) of the sample are labeled using the Raman tags and/or the Rdots, as shown by 1512. This labeling can occur before (not shown) or after (as shown) suspension of the sample in the fluid. Any known or to be known technique for labeling cells with Raman tags can be used here. For example, the labeling is achieved by adding the Raman tags and/or Rdots to the fluid in which the sample is or is to be suspended. The Raman tags and/or Rdots bind to target molecules on the cell surfaces or within the cells. The present solution is not limited in this regard.

Next in 1514, a laser source (for example, laser source 102 of FIG. 1) is enabled such that it produces a laser beam. The laser beam is caused to travel along a path towards a flow cytometer (for example, flow cytometer 104 of FIG. 4). The laser beam can be optionally filtered in 1518 (e.g., via a long-pass filter 108 of FIG. 1) to, for example, reduce a background signal. In 1520, shifted Raman signals are generated by allowing the laser beam to pass through a microfluidic channel (for example, microfluidic channel 116 of FIG. 1) in which the sample is flowed in a one-cell-at-a-time manner. The shifted Raman signals can be optionally filtered in 1522 (for example, using filter(s) 122, 124 of FIG. 1) to, for example, remove spurious or noise signals therefrom. The shifted Raman signals are then detected in 1524, and subsequently used in 1526 to measure or otherwise determine physical and/or chemical characteristics of the cell(s). For example, a first shifted Raman signal indicates that a first cell is of a first type, while a second different shifted Raman signals indicates that a second cell is of a second type. The present solution is not limited to the particulars of this example. Next, 1528 is performed where method 1500 ends or other operations are performed (for example, return to 1502 or 1508).

Figure 35:
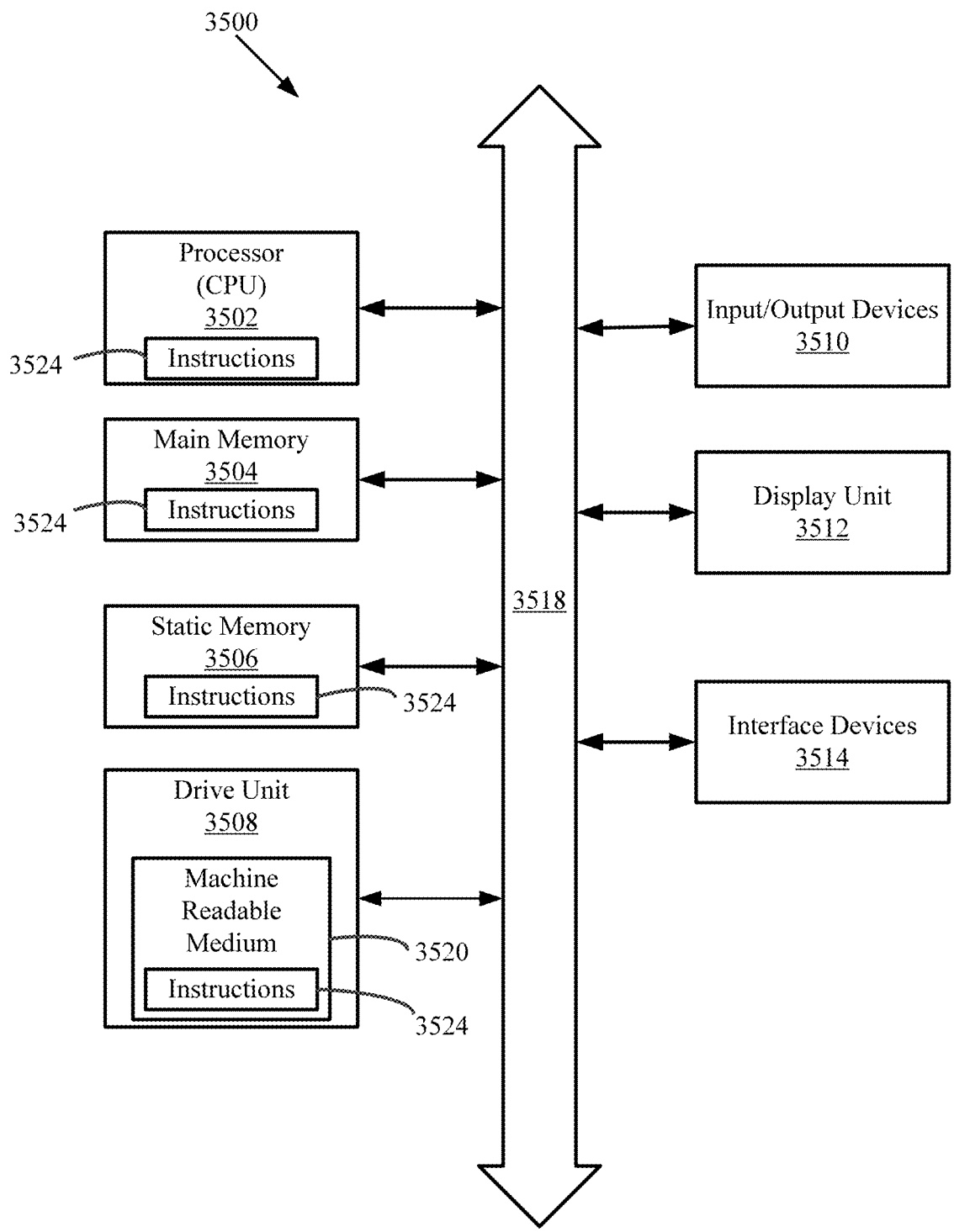
FIG. 35 provides a block diagram of an illustrative computer system.

Referring now to FIG. 35, there is shown a hardware block diagram comprising an illustrative computer system 3500 that can be used for implementing all or part of components 102, 110, 126, 132 of FIGS. 1 and/or 202, 210, 212, 234, 250 of FIG. 4. The machine can include a set of instructions which are used to cause the circuit/computer system to perform any one or more of the methodologies discussed herein. While only a single machine is illustrated in FIG. 35, it should be understood that in other scenarios the system can be taken to involve any collection of machines that individually or jointly execute one or more sets of instructions as described herein.

The computer system 3500 is comprised of a processor 3502 (for example, a Central Processing Unit (CPU)), a main memory 3504, a static memory 3506, a drive unit 3508 for mass data storage and comprised of machine readable media 3520, input/output devices 3510, a display unit 3512 (for example, a Liquid Crystal Display (LCD)) or a solid state display, and one or more interface devices 3514. Communications among these various components can be facilitated by means of a data bus 3518. One or more sets of instructions 3524 can be stored completely or partially in one or more of the main memories 3504, static memory 3506, and drive unit 3508. The instructions can also reside within the processor 3502 during execution thereof by the computer system. The input/output devices 3510 can include a keyboard, a multi-touch surface (for example, a touchscreen) and so on. The interface device(s) 3514 can be comprised of hardware components and software or firmware to facilitate an interface to external circuitry. For example, in some scenarios, the interface devices 3514 can include one or more Analog-to-Digital (A/D) converters, Digital-to-Analog (D/A) converters, input voltage buffers, output voltage buffers, voltage drivers and/or comparators. These components are wired to allow the computer system to interpret signal inputs received from external circuitry and generate the necessary control signals for certain operations described herein.

The drive unit 3508 can comprise a machine readable medium 3520 on which is stored one or more sets of instructions 3524 (for example, software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, Electrically Erasable Programmable Read-Only Memory (EEPROM) and flash memory devices. A tangible medium as described herein is one that is non-transitory insofar as it does not involve a propagating signal.

Computer system 3500 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for flow cytometry, comprising:
   obtaining a plurality of different Raman-active dots each comprising a nanoparticle containing a plurality of Raman tags incorporated therein, the plurality of Raman tags having multiple peaks in a Raman shift region of 400-1600 $cm^{-1}$;
   exposing cells of a sample to the plurality of different Raman-active dots;
   causing the sample and the plurality of different Raman-active dots to flow through a microfluidic channel of a flow cytometer through which a laser beam passes, wherein the laser beam is generated by a single excitation laser;
   detecting Raman signals emitted from the Raman tags of the plurality of different Raman-active dots while being illuminated by the single laser beam; and
   measuring characteristics of the cells based on the detected Raman signals;
   wherein the plurality of different Raman tags are each generated by (i) substituting hydrogens in a tetraene unit of a cyanine dye by deuterium and (ii) introducing at least one substituent to an IR740 skeleton at a respective one of a plurality of different positions without changing an absorption wavelength of the cyanine dye, the at least one substituent comprising Chlorine, Bromine, or Fluorine.

2. The method according to claim 1, wherein at least one peak of a first one of the Raman signals has no overlap with any peaks of other second ones of the Raman signals.

3. The method according to claim 1, wherein at least two of the Raman signals have different intensity ratios and are linear independent with each other.

4. The method according to claim 1, wherein at least two of the Raman signals comprises light of different colors in a Raman spectrum.

5. The method according to claim 4, wherein the different colors comprise between nine and one hundred forty-six colors.

6. The method according to claim 1, wherein a Raman spectrum is generated by Fourier transformation of time-domain interferograms.

7. The method according to claim 1, wherein a first one of the detected Raman signals indicates that a first cell of the sample has first characteristic while a second one of the detected Raman signals indicates that a second cell of the sample has a second different characteristic.

8. The method according to claim 1, wherein the laser beam comprises a Ti:Sapphire laser beam.

9. The method according to claim 1, further comprising causing the laser beam to pass through a pulse shaper and be reflected by chirped mirrors prior to passing through the flow cytometer.

10. The method according to claim 1, further comprising generating a combined laser beam by combining the laser beam with a continuous wave beam.

11. The method according to claim 10, further comprising using an interferometer to divide the combined laser beam into pump-probe pulse pairs and cause the combined laser beam to travel along a path towards the flow cytometer.

12. The method according to claim 11, further comprising separating the continuous wave beam of the combined laser beam from the laser beam of the combined laser beam prior to reaching the flow cytometer.

13. The method according to claim 12, further comprising using the separated continuous wave beam to control operations of the interferometer.

14. The method according to claim 1, further comprising generating the laser beam by a stimulated Raman scattering related laser source, a coherent anti-stokes Raman scattering related laser source, a Fourier transformed coherent anti-stokes Raman scattering related laser source, dual comb based coherent anti-stokes Raman scattering related laser source(s), or quasi-dual comb based coherent anti-stokes Raman scattering related laser source(s).

15. The method according to claim 1, wherein the exposing comprises exposing the cells to a first type of the plurality of different Raman-active dots at a first time and exposing the cells to a second type of the plurality of Raman-active dots at a subsequent second time.

16. The method according to claim 15, further comprising using results of said measuring to decode time-varying uptake of the Raman-active dots.

17. The method according to claim 1, wherein said measuring characteristics of the cells comprises simultaneously measuring at least ten different molecules while the Raman tags of the Raman-active dots are being excited by the laser beam being generated by the single excitation laser.

18. A system, comprising:
a first laser source comprising a single excitation laser configured to generate a single laser beam;
a flow cytometer comprising a microfluidic channel through which a fluid flows, the fluid comprising a plurality of cells suspended therein that are labeled with a plurality of different Raman-active dots, each said Raman-active dot comprising a nanoparticle containing a plurality of Raman tags incorporated therein, the plurality of Raman tags having multiple peaks in a Raman shift region of 400-1600 $cm^{-1}$;
a detector configured to detect Raman signals emitted from the Raman tags of the plurality of different Raman-active dots while being illuminated by the single laser beam as the single laser beam passes through the microfluidic channel; and
a computing device configured to determine characteristics of the plurality of cells based on the detected Raman signals;
wherein the plurality of different Raman tags are each generated by (i) substituting hydrogens in a tetraene unit of a cyanine dye by deuterium and (ii) introducing at least one substituent to an IR740 skeleton at a respective one of a plurality of different positions without changing an absorption wavelength of the cyanine dye, the at least one substituent comprising Chlorine, Bromine, or Fluorine.

19. The system according to claim 18, wherein at least one peak of a first one of the Raman signals has no overlap with any peaks of other second ones of the Raman signals.

20. The system according to claim 18, wherein at least two of the Raman signals have different intensity ratios and are linear independent with each other.

21. The system according to claim 18, wherein the Raman signals comprise light of different colors in a Raman spectrum.

22. The system according to claim 21, wherein the different colors comprise between nine and one hundred forty-six colors.

23. The system according to claim 18, wherein a Raman spectrum is generated by Fourier transformation of time-domain interferograms.

24. The system according to claim 18, wherein a first one of the detected Raman signals indicates that a first cell of the plurality of cells has first characteristic while a second one of the detected Raman signals indicates that a second cell of the plurality of cells has a second different characteristic.

25. The system according to claim 18, wherein the laser beam comprises a Ti:Sapphire laser beam.

26. The system according to claim 18, further comprising a pulse shaper through which the laser beam passes and chirped mirrors by which the laser beam is reflected, prior to passing through the flow cytometer.

27. The system according to claim 18, further comprising a second laser source configured to generate a continuous wave beam that is combined with the laser beam to produce a combined laser beam, prior to passing through the flow cytometer.

28. The system according to claim 27, further comprising an interferometer configured to divide the combined laser beam into pump-probe pulse pairs and cause the combined laser beam to travel along a path towards the flow cytometer.

29. The system according to claim 28, wherein the continuous wave beam is separated from the combined laser beam after exiting the interferometer and prior to reaching the flow cytometer.

30. The system according to claim 29, wherein the separated continuous wave beam is used to control operations of the interferometer.

31. The system according to claim 18, wherein the first laser source comprises a stimulated Raman scattering related laser source, a coherent anti-stokes Raman scattering related laser source, a Fourier transformed coherent anti-stokes Raman scattering related laser source, dual comb based coherent anti-stokes Raman scattering related laser source(s), or quasi-dual comb based coherent anti-stokes Raman scattering related laser source(s).

* * * * *